US011429217B2

(12) United States Patent
Aoki et al.

(10) Patent No.: US 11,429,217 B2
(45) Date of Patent: *Aug. 30, 2022

(54) DISPLAY DEVICE AND SENSOR

(71) Applicant: Japan Display Inc., Tokyo (JP)

(72) Inventors: Kinichi Aoki, Tokyo (JP); Hiromasa Miyashita, Tokyo (JP); Harutoshi Kaneda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,795

(22) Filed: Jun. 2, 2021

(65) Prior Publication Data

US 2021/0286458 A1    Sep. 16, 2021

Related U.S. Application Data

(63) Continuation of application No. 16/892,975, filed on Jun. 4, 2020, now Pat. No. 11,086,432, which is a continuation of application No. 16/352,345, filed on Mar. 13, 2019, now Pat. No. 10,698,517, which is a continuation of application No. 15/602,748, filed on May 23, 2017, now Pat. No. 10,275,063.

(30) Foreign Application Priority Data

May 26, 2016   (JP) .................. 2016-105033
Oct. 31, 2016  (JP) .................. 2016-213185

(51) Int. Cl.
*G06F 3/041*     (2006.01)
*G06F 3/044*     (2006.01)

(52) U.S. Cl.
CPC .......... *G06F 3/0412* (2013.01); *G06F 3/0446* (2019.05); *G06F 3/04164* (2019.05); *G06F 2203/04107* (2013.01)

(58) Field of Classification Search
CPC .. G06F 3/0412; G06F 3/0446; G06F 3/04164; G06F 2203/04107
See application file for complete search history.

(56) References Cited

U.S. PATENT DOCUMENTS

| 10,019,111 B2   | 7/2018 | Kurashima |
| 2005/0092108 A1 | 5/2005 | Andermo |
| 2010/0220071 A1 | 9/2010 | Nishihara et al. |

(Continued)

FOREIGN PATENT DOCUMENTS

JP    2014-123640 A    7/2014

OTHER PUBLICATIONS

Machine translation of Japanese Office Action for related Japanese Patent Application No. 2016-213185 dated Jan. 14, 2020. 5 pages.

*Primary Examiner* — Peter D McLoone
(74) *Attorney, Agent, or Firm* — K&L Gates LLP

(57) ABSTRACT

According to one embodiment, a display device includes a display panel which displays an image, a touch panel provided on the display panel and including a sensor area in which a plurality of electrodes for detecting touch operation are provided and a peripheral area provided around the sensor area, a controller which controls the plurality of electrodes, lead lines provided in the peripheral area to connect the electrodes provided in the sensor area to the controller and a conductive layer provided in a region which overlaps at least part of the lead lines.

20 Claims, 17 Drawing Sheets

(56) References Cited

U.S. PATENT DOCUMENTS

| | | |
|---|---|---|
| 2011/0090159 A1 | 4/2011 | Kurashima |
| 2012/0081328 A1 | 4/2012 | Kandziora et al. |
| 2013/0092520 A1 | 4/2013 | Lee et al. |
| 2013/0093724 A1 | 4/2013 | Liu |
| 2014/0176840 A1 | 6/2014 | Hashido |
| 2014/0218328 A1 | 8/2014 | Haapakoski et al. |
| 2014/0375910 A1 | 12/2014 | Tada et al. |
| 2016/0098143 A1 | 4/2016 | Kida et al. |
| 2016/0132157 A1 | 5/2016 | Lee et al. |
| 2016/0147319 A1 | 5/2016 | Agarwal et al. |
| 2016/0179254 A1 | 6/2016 | Kurashima |
| 2017/0115805 A1 | 4/2017 | Chiang et al. |
| 2017/0131844 A1 | 5/2017 | Kurashima |
| 2017/0262129 A1 | 9/2017 | Cheng et al. |
| 2017/0285835 A1 | 10/2017 | Shepelev et al. |
| 2018/0011602 A1 | 1/2018 | Kurashima |
| 2018/0032189 A1* | 2/2018 | Lee .................... G09G 3/3233 |

* cited by examiner

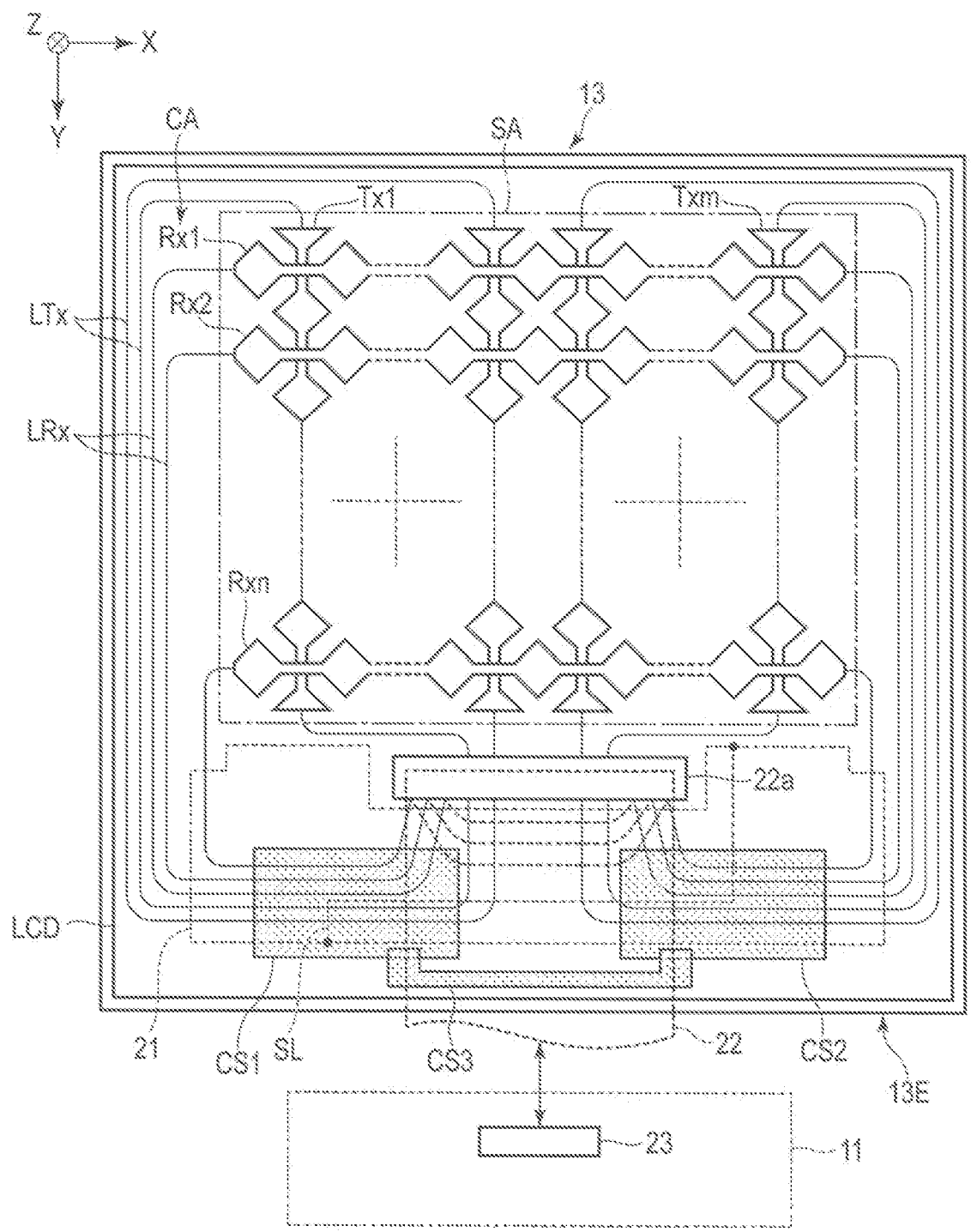
F I G. 11A

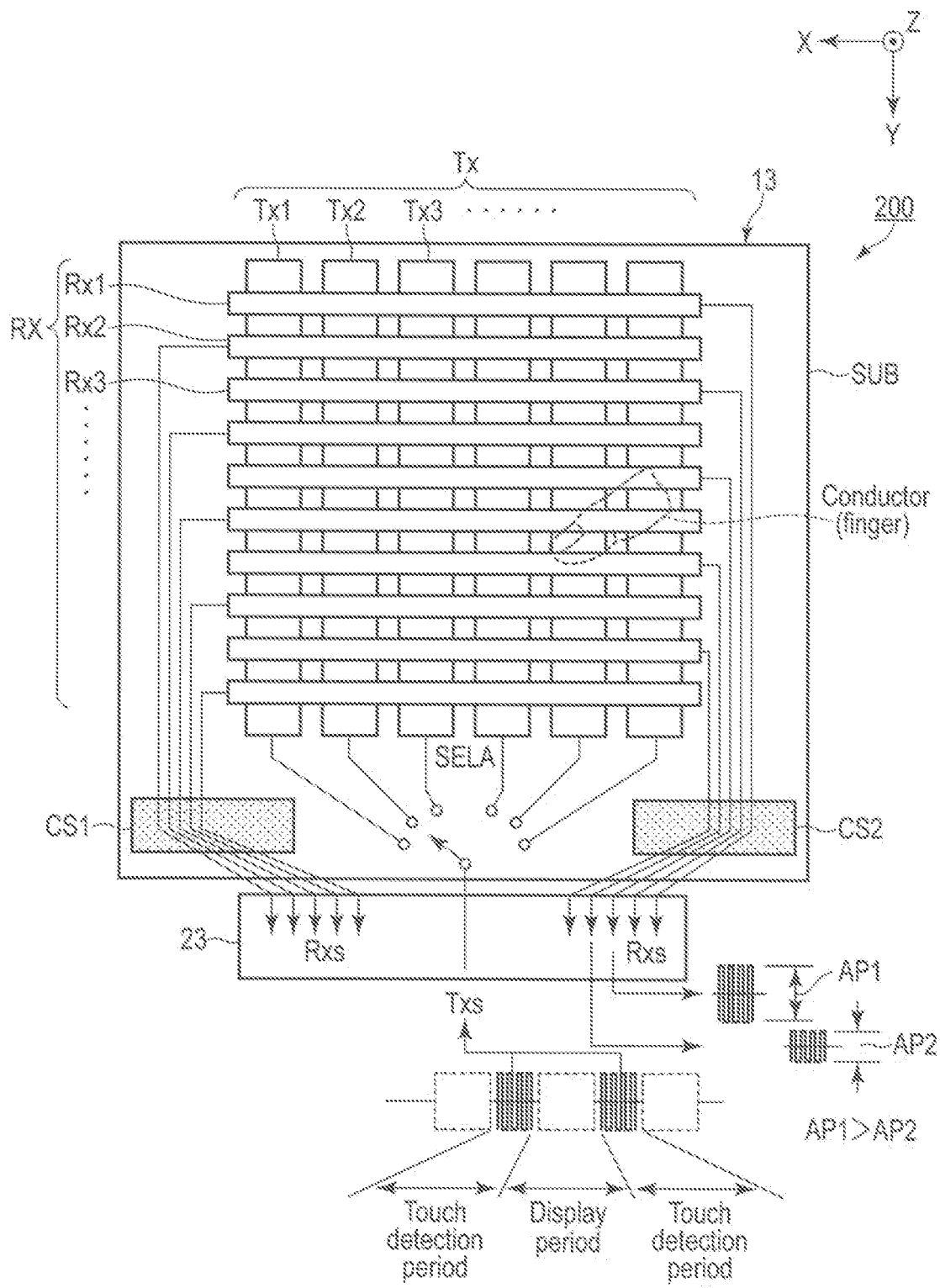
F I G. 14

DISPLAY DEVICE AND SENSOR

CROSS-REFERENCE TO RELATED APPLICATIONS

The present application is a continuation of U.S. application Ser. No. 16/892,975, filed Jun. 4, 2020, which is a continuation of U.S. application Ser. No. 16/352,345, filed Mar. 13, 2019, issued as U.S. Pat. No. 10,698,517 on Jun. 30, 2020, which is a continuation of U.S. application Ser. No. 15/602,748, filed on May 23, 2017, issued as U.S. Pat. No. 10,275,063 on Apr. 30, 2019, which application claims the benefit of priority from Japanese Patent Applications No. 2016-105033, filed May 26, 2016; and No. 2016-213185, filed Oct. 31, 2016, the entire contents of each of which are incorporated herein by reference.

FIELD

Embodiments described herein relate generally to a display device comprising a touch sensor, and a sensor.

BACKGROUND

Personal digital assistants (smartphones, personal assistant devices (PADs), tablet computers, etc.) comprise a display device of liquid crystal, organic electroluminescence (to be referred to as EL hereinafter) or the like. The display devices used for the personal digital assistants generally comprise additional functions including as that of a touch sensor.

The liquid crystal displays with a touch-sensor function, are subjected to noise immunity test to evaluate the immunity to external electromagnetic noise. An example of the noise immunity test is that a noise wave is radiated from an antenna onto a touch operation surface, and the occurrence of an erroneous touch operation (malfunction) due to the noise wave is checked.

For preventing the occurrence of malfunctions, it is necessary to form the detection electrode, which detects touch operations, to be insusceptible to noise waves reaching from outside. Here, shielding the detection electrode is one method. It entails the limited shielded region and the increase in cost for shielding.

SUMMARY

The present disclosure generally relates to a display device.

According to one embodiment, a display device is provided. The display device includes a display panel which displays an image, a touch panel provided on the display panel and including a sensor area in which a plurality of electrodes for detecting touch operation are provided and a peripheral area provided around the sensor area, a controller which controls the plurality of electrodes, lead lines provided in the peripheral area to connect the electrodes provided in the sensor area to the controller and a conductive layer provided in a region which overlaps at least part of the lead lines.

Additional features and advantages are described herein, and will be apparent from the following Detailed Description and the figures.

BRIEF DESCRIPTION OF THE DRAWINGS

FIG. 11A is a plan view schematically showing a display device according to the sixth embodiment.

FIG. 14 is a plan view schematically showing a mutual-capacitive touch detection device applied to the display devices according to the first to eighth embodiments.

DETAILED DESCRIPTION

Figure 1:
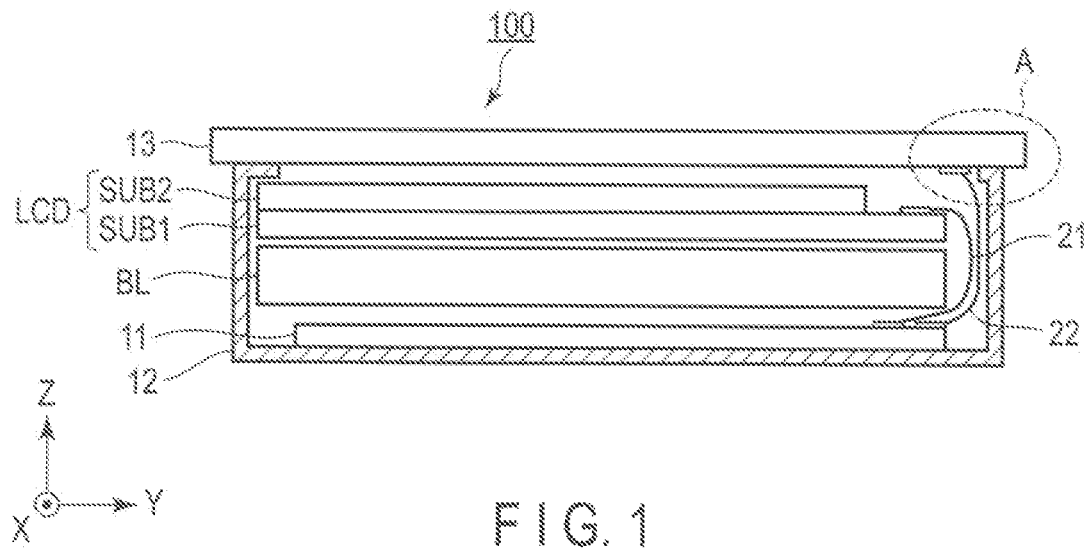
FIG. 1 is a cross section schematically showing a display device according to the first embodiment.

In general, according to one embodiment, a display device comprises: a display panel which displays an image; a touch panel provided on the display panel and including a sensor area in which a plurality of electrodes for detecting touch operation are provided and a peripheral area provided around the sensor area; a controller which controls the plurality of electrodes; lead lines provided in the peripheral area to connect the electrodes provided in the sensor area to the controller; and a conductive layer provided in a region which overlaps at least part of the lead lines.

According to another embodiment, a sensor comprises: a substrate including a sensor area and a peripheral area surrounding the sensor area; an electrode provided in the sensor area so as to detect a touch operation; a controller which controls the electrode; a terminal member provided in the peripheral area so as to connect the electrode and the controller to each other; and a first conductive layer located between an end of the substrate and the terminal member, the first conductive layer being at a reference potential and in contact with the substrate.

According to yet another embodiment, a sensor comprises: a substrate comprising a main surface including a sensor area and a peripheral area surrounding the sensor area, and a side surface; an electrode provided in the sensor area, to detect a touch operation; a controller which controls the electrode; a terminal member provided in the peripheral area, to connect the electrode to the controller; and a first conductive layer which is at a reference potential and in contact with the side surface.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

First Embodiment

This embodiment describes a display device with a touch detection function. This embodiment is applicable to any of the devices which adopt the liquid crystal or a light emitting device such as an organic EL device, as the display element. Further, this embodiment is applicable to the devices which use an exclusive touch panel independent from the display panel, or which share some parts with the parts of the display panel, etc.

FIG. 1 is a cross section schematically showing a display device according to this embodiment. This embodiment is directed to a liquid crystal display 100, and will be described with generally adopted definitions of the lateral direction in plan view being the first direction X, the longitudinal direction being the second direction Y and the thickness direction being the third direction Z. Further, the screen side, that is, the third direction Z side, is defined as an upper side (surface side), and the opposite side to the screen is defined as a lower side (rear side).

The liquid crystal display 100 comprises an active-matrix liquid crystal display panel LCD, a backlight unit BL, a touch panel 13, a control board 11, a shield case 12, etc.

The liquid crystal display panel LCD has, for example, a rectangular shape in plan view, and comprises a transmissive display function which displays images by selectively transmitting the light irradiated from the backlight unit BL. Note that the liquid crystal display panel LCD may be of a type which comprise, in addition to the transmissive display function, a reflective display function which displays images by selectively reflecting external light.

The liquid crystal display panel LCD comprises a first substrate SUB1, an opposing second substrate SUB2 and a liquid crystal layer interposed between the first substrate SUB1 and the second substrate SUB2. The first substrate SUB1 and second substrate SUB2 are formed from a transparent insulating substrate of, for example, glass or resin.

The backlight unit BL is provided to oppose a lower surface of the liquid crystal display panel LCD. The backlight unit BL may be any of the existing various types. For example, one type for the backlight unit BL is a unit in which light-emitting devices are arranged on an edge of a light guide plate, or another type is a unit in which a cold cathode ray tube is arranged on a rear side of a glass plate which scatters light.

The control board 11 is provided on a lower surface side of the backlight unit BL. On the control board 11, mounted are an LCD-control IC chip which controls the liquid crystal display panel LCD, a touch-panel driving IC chip which drives the touch detection device, which will be explained later, in collaboration with the LCD-control IC chip, etc. Further, mounted thereon are a communication module for communicating with outside and a host device on which various types of applications are implemented to control the operation of the liquid crystal display.

The control board 11 is covered with the shield case (or film-like shield cover) 12 formed from, for example, a metal material to avoid external interference with the operation thereof.

The touch panel 13, which constitutes the touch detection device, is provided on an upper surface (that is, an opposite side to the backlight unit BL) of the liquid crystal display panel LCD. The touch panel 13 contains a transparent synthetic resin or glass substrate, and comprises at least the detection electrode, as will be describe later.

The touch panel 13 and the control board 11 are connected to each other by a flexible printed circuit substrate 22 for touch panel(, which will be referred to as FPC hereinafter). Note that the above-described touch-panel driving IC chip may be mounted on the touch-panel FPC 22. The liquid crystal display panel LCD and the control board 11 are connected to each other by a display-panel FPC 21 (including chip-on film (COF)).

Figure 2:
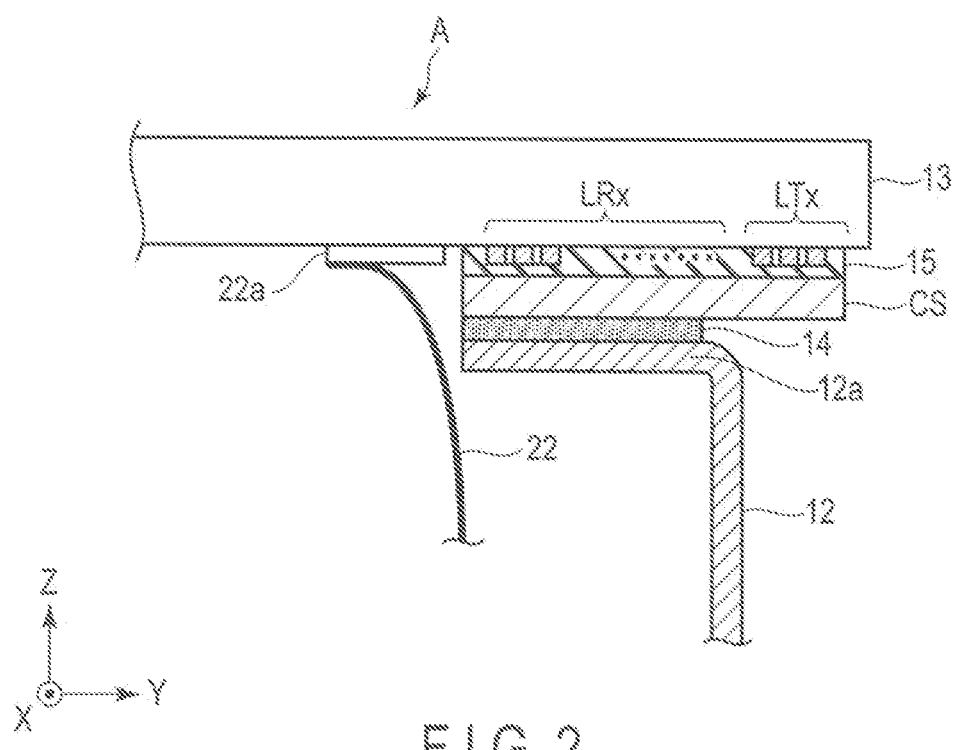
FIG. 2 is an enlarged view of the region A shown in FIG. 1.

FIG. 2 is an enlarged view of the region A encircled with the dashed line in FIG. 1. The region A is a part of the edge of the touch panel 13 along the second direction Y and indicating mainly the state where a flat surface opposite to the touch operation surface is sectioned along the third direction Z. In the flat surface, lead lines LTx connected to drive electrodes, which will be described later, and lead lines LRx connected to detection electrodes are located.

At least part of these lead lines LTx and LRx is covered with a conductive layer CS for rejecting noise. The surfaces of the lead lines LTx and LRx are coated with an insulation material 15, and therefore the lines are not electrically connected to the conductive layer CS. The conductive layer CS is, for example, a sheet-like member of a metal material such as copper or aluminum. The conductive layer CS may comprise, for example, a surface having adhesive property, or it may be adhered to the insulation material 15 with adhesive. Or, the conductive layer CS may be formed, for example, by applying a pasty conductive material containing a metal material such as silver. In this case, the insulation material 15 may be coated directly with the conductive material or a member coated with the conductive material may be arranged to overlap with the lead lines LTx and LRx.

Between the conductive layer CS and the shield case 12, a gasket 14 is provided as a shock-absorbing material. The shield case 12 includes an edge a part of which is bent into a bent piece 12a parallel to the touch panel 13. The gasket 14 is sandwiched between the bent piece 12a and the conductive layer CS.

In an area on the opposite surface to the touch operation surface of the touch panel 13, and also surrounded by the shield case 12, a terminal member 22a is provided for connecting the touch-panel FPC 22.

Figure 3A:
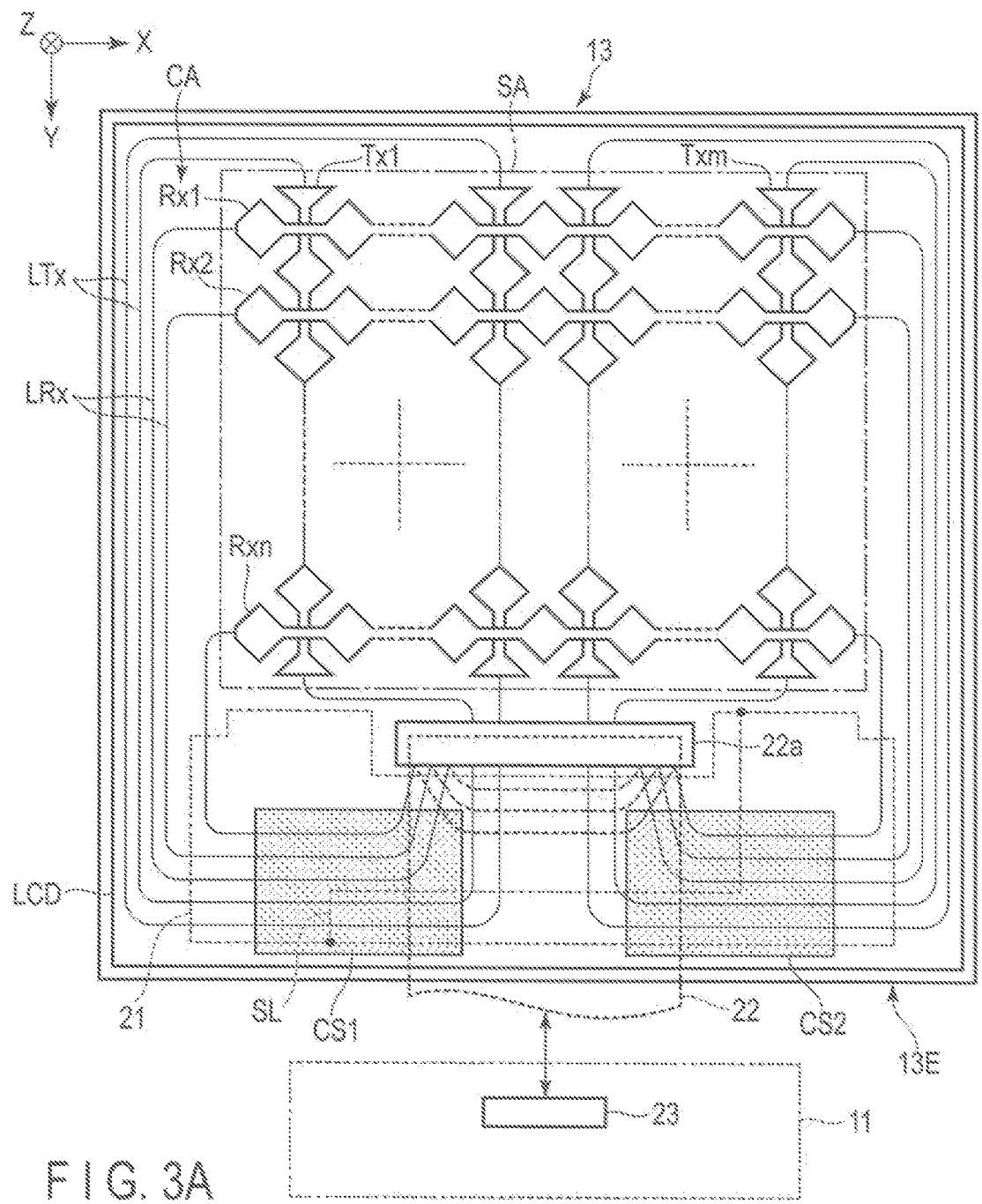
FIG. 3A is a plan view schematically showing a touch panel employed in the display device shown in FIG. 1.

FIG. 3A is a plan view showing an example of arrangement of the detection electrodes Rx and the drive electrodes Tx provided in the touch panel 13 and an example of the attachment position of the conductive layer CS as seen from an opposite side to the touch operation surface (that is, the liquid crystal display panel LCD side). The touch panel 13 comprises, for detecting touch operations, a plurality of drive electrodes Tx (Tx1, Tx2, . . . , Txm) and a plurality of detection electrodes Rx (Rx1, Rx2, . . . , Rxn) insulated from these drive electrodes Tx and arranged to cross them in a sensor area SA. The detection electrodes Rx (Rx1, Rx2, . . . , Rxn) each extending along the first direction X in the sensor area SA are arranged in parallel to each other along the second direction Y with a gap between each adjacent pair. The drive electrodes Tx (Tx1, Tx2, . . . , Txm) each extending along the second direction Y are arranged in parallel to each other along the first direction X with a gap between each adjacent pair. At each of the crossing portions between the drive electrodes Tx and the respective detection electrodes Rx, a capacitance is formed between each respective pair of electrodes crossing each other.

A peripheral area CA is provided around the sensor area SA to surround it. In the peripheral area CA, the lead lines LTx connected respectively to the drive electrodes Tx and the lead lines LRx connected respectively to the detection electrodes Rx are arranged. The drive electrodes Tx of each column form a loop by the respective lead lines LTx. More specifically, along the first direction X, the lead lines LTx of the drive electrodes Tx in a left half region of the touch panel 13 form a loop through a left edge region of the touch panel 13. The lead lines LTx of the drive electrodes Tx in a right half region of the touch panel 13 form a loop through a right edge region of the touch panel 13. The lead lines LRx of the detection electrodes Rx of each row form a loop through an edge region of the touch panel 13 along the second direction Y, that is, an edge region on an end portion 13E side parallel to the first direction X.

The above-described arrangement is only an example and the shape or the patterns of the drive electrodes Tx and the detection electrodes Rx are not necessarily limited to those shown in the figure. In the above-provided descriptions, the lead lines LTx and LRx form loops, but it is not necessarily so. For example, it suffices if the drive electrodes Tx and the detection electrodes Rx are formed to be coupled to a touch-panel driving IC chip 23 through the touch-panel FPC 22.

The touch-panel FPC 22 is located on the end portion 13E side and connected to the terminal member 22a. The terminal member 22a is a line-integrated portion for connecting the lead lines LTx and LRx to the outside. The lead lines LTx and LRx connected to the terminal member 22a are coupled to the touch-panel driving IC chip 23 provided in the control board 11 through the touch-panel FPC 22. The location of the terminal member 22a is not necessarily limited to within the loop of lead lines shown in the figure. More specifically, for example, the terminal member 22a may be located on the end portion 13E side.

In the vicinity of the region where the touch-panel FPC 22 is connected, the display-panel FPC (including COF) 21 is also provided. More specifically, the display-panel FPC (including COF) 21 is connected to the liquid crystal display panel LCD on the same side as the touch-panel FPC 22 along the second direction Y. On the display-panel FPC (including COF) 21, provided are a drive signal line for driving the liquid crystal display panel LCD, a plurality of video signal lines SL (only one representative signal line is shown) for supplying video signals to the liquid crystal display panel LCD, a control signal line for controlling switching of signals or switches, etc. These video signal lines SL, etc. are coupled to the LCD-control IC chip (not shown) provided in the control board 11 through the display-panel FPC (including COF) 21.

Here, a plurality of conductive layers CS, namely, a first conductive layer CS1 and a second conductive layer CS2 are provided on the end portion 13E side, in a region which partially covers the lead lines LTx and LRx. The first conductive layer CS1 and the second conductive layer CS2 are provided to be apart from each other along the first direction X so as to partially overlap the lead lines LTx and LRx provided along the first direction X in the vicinity of the terminal member 22a. Note that it suffices if the first conductive layer CS1 and the second conductive layer CS2 are provided in the region overlapping at least the lead lines LRx. Moreover, there may be one conductive layer CS or may be three or more.

The potentials of the first conductive layer CS1 and the second conductive layer CS2 are fixed to a reference potential, for example, the ground potential. That is, the first conductive layer CS1 and second conductive layer CS2 are electrically connected to a member (, which may be called a reference potential member hereinafter) whose potential is fixed to a reference potential such as the ground potential. In this embodiment, for example, the housing which constitutes the backlight unit BL or the shield case 12 functions as the reference potential member as will be described later, and therefore the first conductive layer CS1 and the second conductive layer CS2 are directly or indirectly connected to the housing or the shield case 12.

Figure 3B:
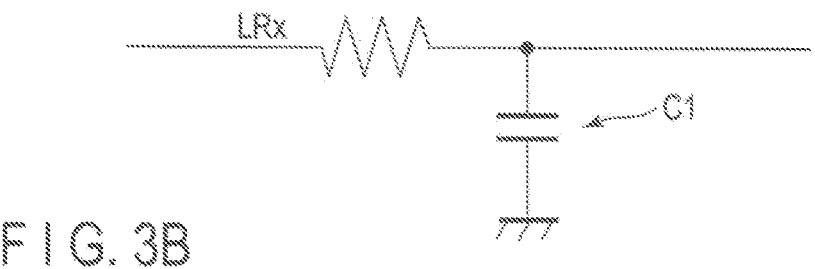
FIG. 3B is a diagram showing an example of an equivalent circuit of the region covered by a conductive layer.

FIG. 3B shows an example of the equivalent circuit of the region covered by the conductive layer CS. Note that FIG. 3B shows the representative equivalent circuit formed from the lead lines LRx and conductive layer CS, but similar equivalent circuits can be represented for the lead lines LTx and conductive layer CS, and the video signal lines SL and conductive layer CS.

The lead lines LRx have a certain resistance. When the conductive layer CS fixed to the reference potential (for example, the ground potential) is provided in the region overlapping the lead lines LRx, a coupling capacitance Cl is created between each of the lead lines LRx and the conductive layer CS. Here, the coupling capacitance Cl and the resistance of the respective lead line LRx (and the detection electrode Rx) function as a filter to reduce the noise in the value of the current flowing through the detection electrode Rx. That is, the noise current flowing through the detection electrode Rx is directed to the terminal connected to the ground potential through the coupling capacitance Cl.

Figure 4A:
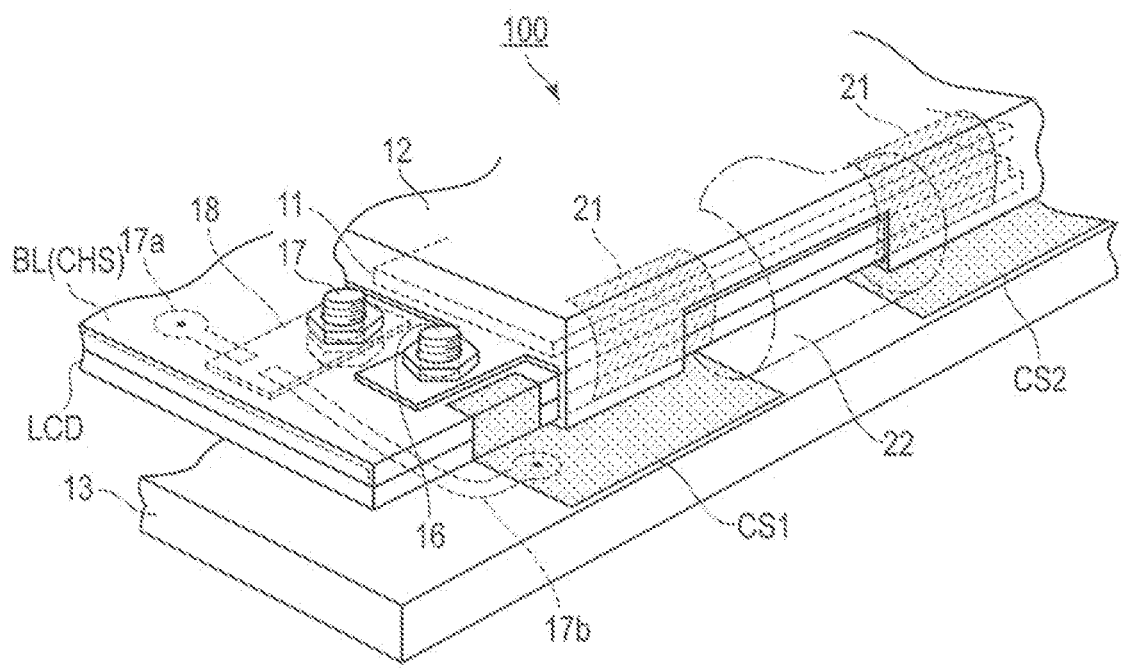
FIG. 4A is a perspective view schematically showing the display device shown in FIG. 1.

FIG. 4A is a perspective view schematically showing an appearance of the liquid crystal display 100 according to this embodiment. FIG. 4A shows an opposite side to the touch operation surface of the liquid crystal display 100.

The first conductive layer CS1 and the second conductive layer CS2 are electrically connected to a housing CHS constituting the backlight unit BL. In the example shown in FIG. 4A, the first conductive layer CS1 and the second conductive layer CS2 are in contact with the housing CHS. Further, the shield case 12 is fixed to the housing CHS with a screw 16. Thus, the shield case 12 can be equalized in terms of potential to the housing CHS. The housing CHS is coupled to a reference potential (ground potential) member 18. In the example shown in FIG. 4A, the housing CHS is electrically connected to the reference potential member 18 through a screw (fixing member) 17 or a conductive member 17a. In the case where the display device is of some other type, the first conductive layer CS1 and the second conductive layer CS2 may be connected to the reference potential member 18 not limitedly thought the backlight unit BL but through a conductive member 17b.

Figure 4B:
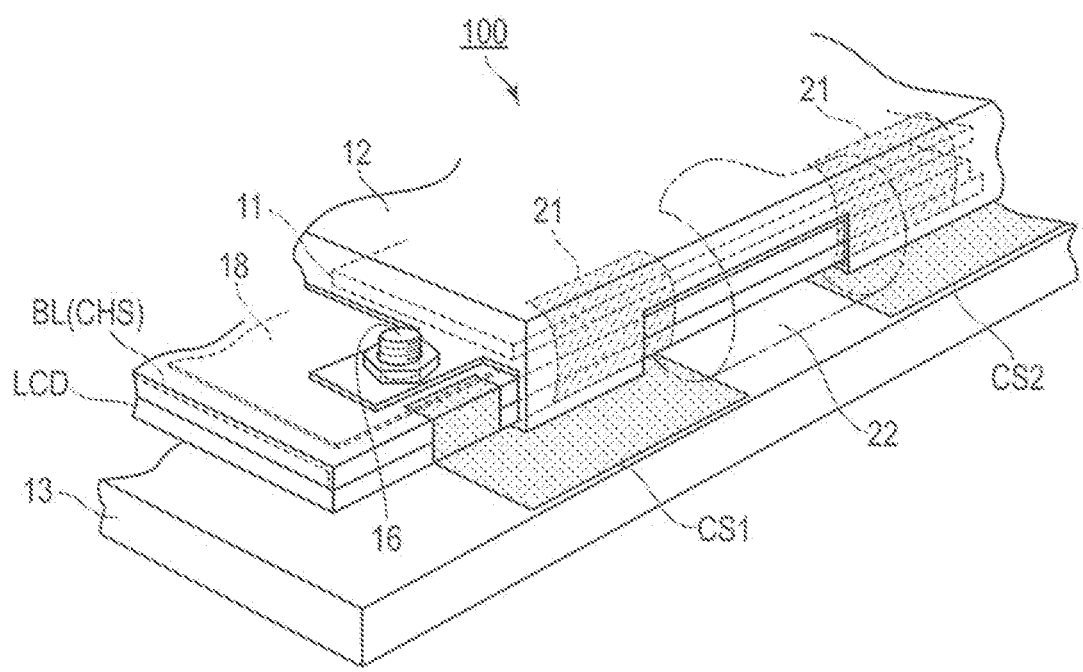
FIG. 4B is a perspective view schematically showing another example of the display device shown in FIG. 1.

Moreover, as shown in FIG. 4B, the housing CHS need not be fixed to the reference potential member 18 with the screw 17 mentioned above. In this case, the housing CHS is capacitively coupled with the reference potential member 18.

This embodiment is described as an example on the assumption case where the display device of a type comprising a transmissive display function or a reflective display function. When the display device is a reflective liquid crystal display or an organic EL display including an organic EL device, the backlight unit BL can be omitted. In this case, for example, by connecting the housing of the shield case 12 or the like to the reference potential member with a fixed member or capacitive coupling and connecting the conductive layer CS to the housing, this embodiment can be applied also to the reflective liquid crystal display or the organic EL display.

According to this embodiment, in the peripheral area CA where the lead lines LTx and LRx are formed, the conductive layer CS of a conductive material is provided in the region which at least partially overlaps the lead lines LTx and LRx near the touch-panel FPC 22. Thus, even if noise is created due to, for example, the the adverse effect of electromagnetic waves and the like in the lead lines LTx and LRx, it is possible to reduce the noise entering the touch-panel FPC 22 in the peripheral area CA of the touch panel 13. In other words, the noise which enters the touch-panel driving IC chip 23 provided in the control board 11 through touch-panel FPC 22 can be reduced. Therefore, it becomes possible to suppress the malfunction of the touch panel 13.

Moreover, according to this embodiment, the structure can be simplified to be able to reduce the production cost, and further the adverse effect of noise can be effectively reduced as compared to the case where the cover made from a conductive material is provided in the entire region of the touch panel 13.

Furthermore, as can be seen in FIG. 3A, the conductive layers CS are provided also in the regions which overlap the display-panel FPC (including COF) 21 connected to the LCD-control IC chip. Thus, the adverse effect of the noise created onto the video signal lines SL can also be reduced. Therefore, for example, screen flicker, which may be caused by the noise, can be suppressed, thereby improving the display quality. Note that the lead lines LRx and/or LRx extend electrically to be located on the touch-panel FPC 22, the conductive layer CS is provided to partially overlap the lead lines LRx and/or LRx located on the touch-panel FPC 22. The conductive layer CS functions to prevent the malfunction of the touch panel 13 and noise contamination to video signals, and thus it is utilized effectively at low cost.

Second Embodiment

Figure 5:
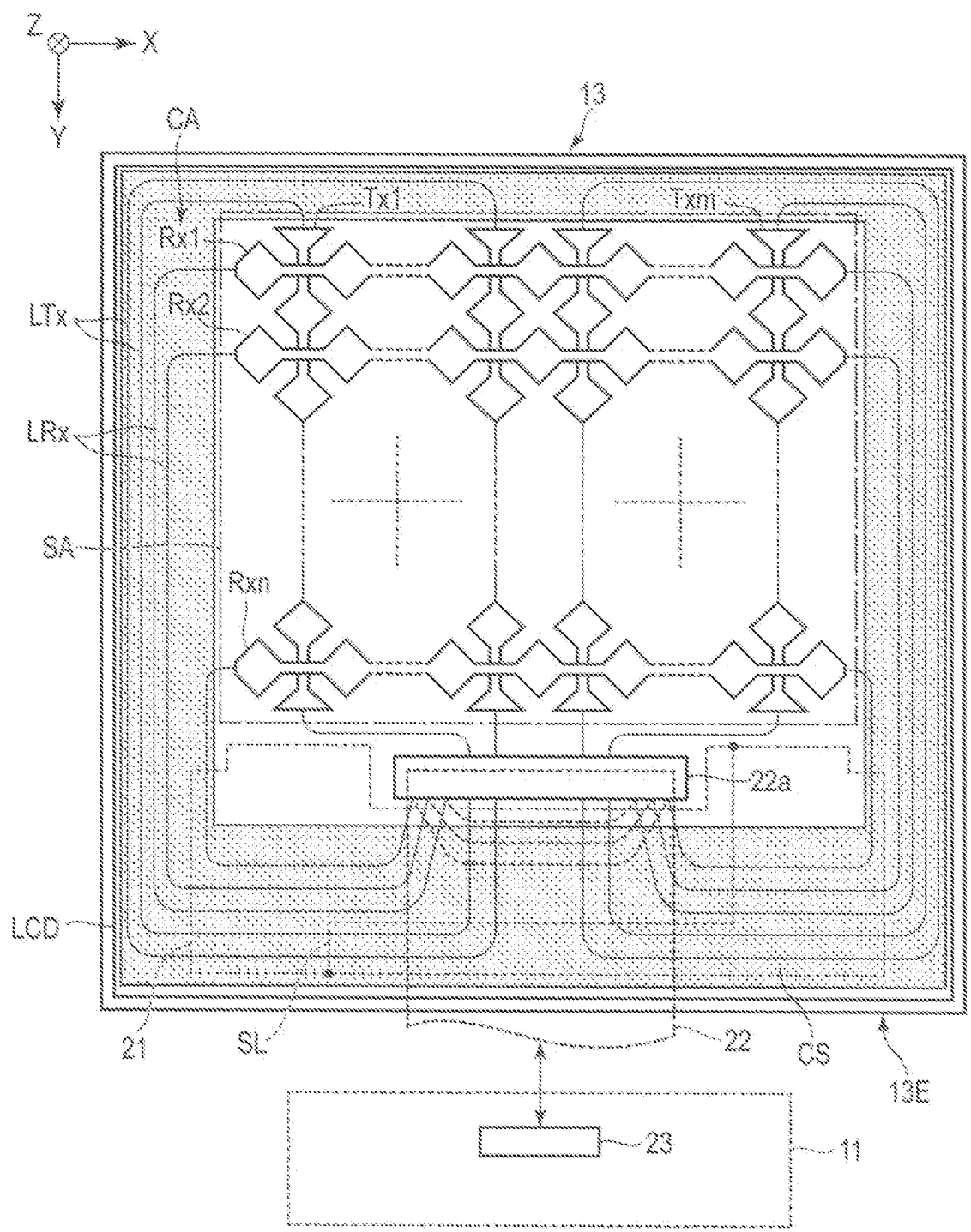
FIG. 5 is a plan view schematically showing a display device according to the second embodiment.

FIG. 5 is a plan view schematically showing a touch panel 13 used in a display device according to the second embodiment. The second embodiment is different from the first embodiment in that a conductive layer CS which covers the lead lines LRx and LRx is provided on substantially the entire peripheral area CA. In the illustrated example, the conductive layer CS is formed to be annular to surround the sensor area SA and the terminal member 22a.

Note that the annular conductive layer CS need not be formed from a single member, but from a plurality of members. For example, the conductive layer CS comprises two members extending in the first direction X and two members extending in the second direction Y, and these members may be connected to each other.

In this embodiment also, an advantageous effect similar to that of the first embodiment can be obtained. Further, according to this embodiment, the area where the lead lines LRx and LRx and the conductive layer CS overlap each other is larger; therefore the adverse effect of the noise created in the lead lines LRx and LRx can be further reduced.

Third Embodiment

Figure 6:
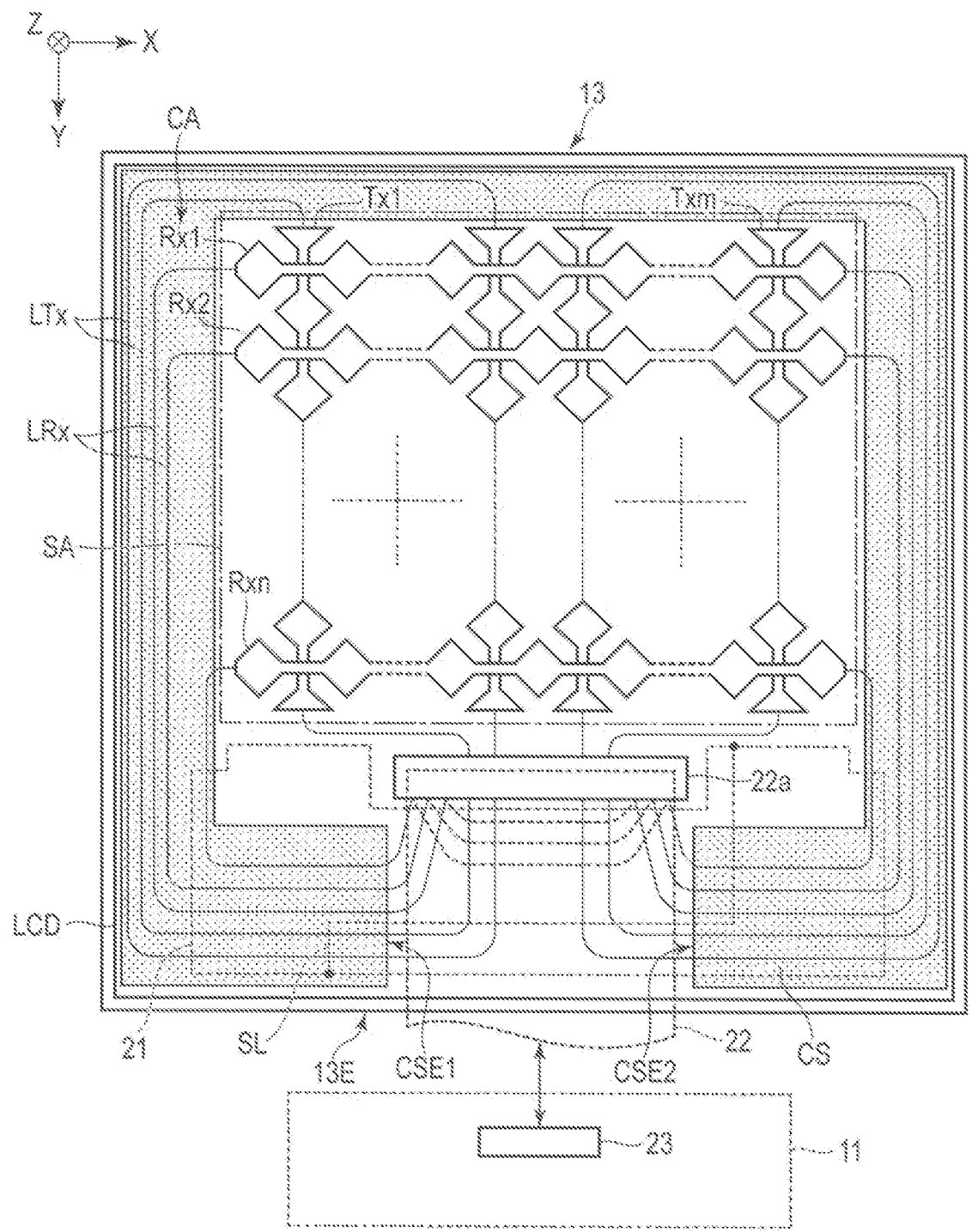
FIG. 6 is a plan view schematically showing a display device according to the third embodiment.

FIG. 6 is a plan view schematically showing a touch panel 13 used in a display device according to the third embodiment.

The third embodiment is different from the second embodiment in that a conductive layer CS is not provided between the terminal member 22a and the end portion 13E of the touch panel 13. More specifically, the conductive layer CS is formed into substantially a character C shape, which includes a first end portion CSE1 and a second end portion CSE2 separated from each other along the first direction X between the terminal member 22a and the end portion 13E. Note that the conductive layer CS having such a shape may be formed from a single member or from a plurality of members.

In this embodiment also, an advantageous effect similar to that of the second embodiment can be obtained.

Fourth Embodiment

Figure 7:
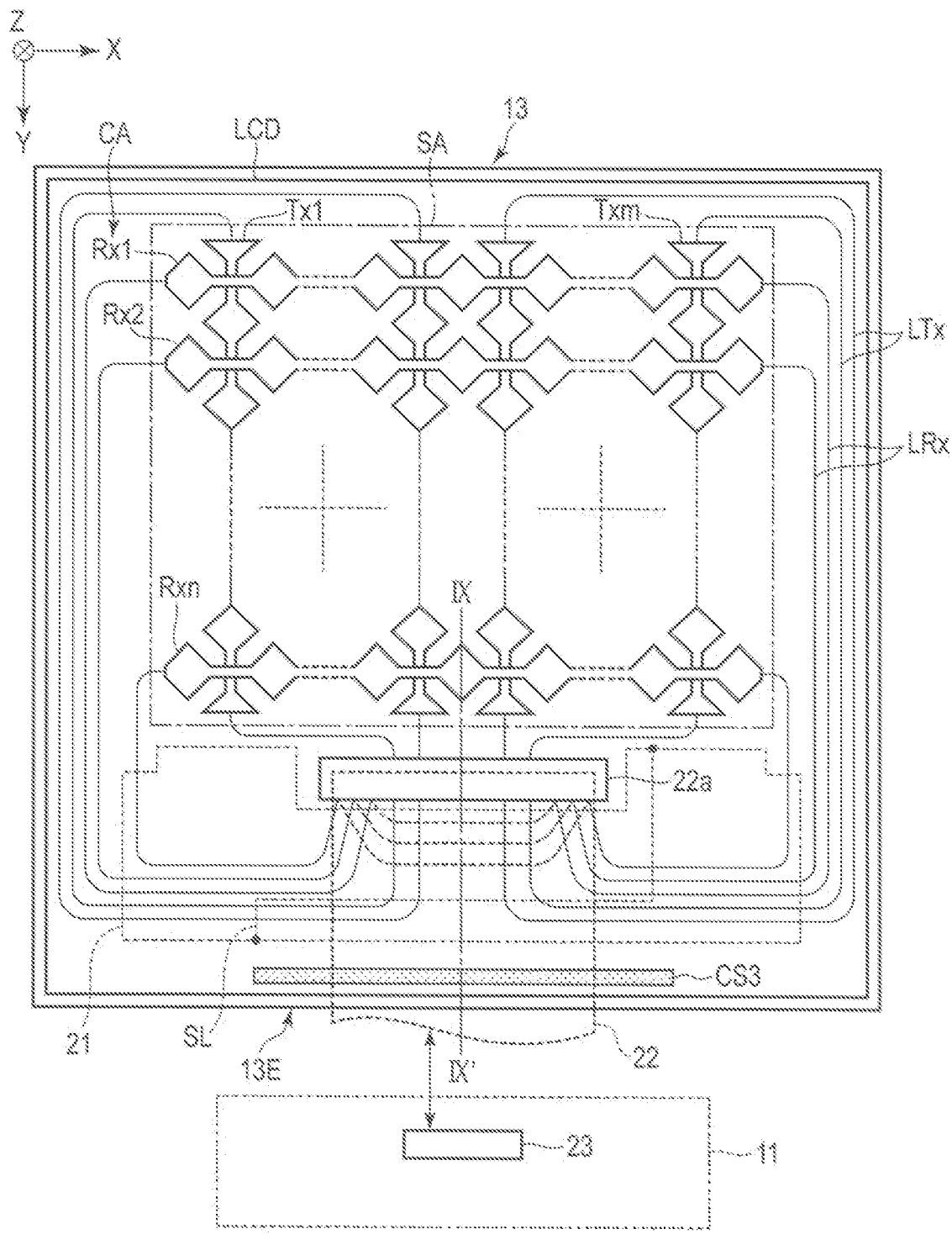
FIG. 7 is a plan view schematically showing a display device according to the fourth embodiment.

FIG. 7 is a plan view schematically showing a touch panel 13 used in a display device according to the fourth embodiment. The fourth embodiment is different from the first embodiment in that a third conductive layer CS3 is provided between the terminal member 22a and the end portion 13E of the touch panel 13.

The third conductive layer CS3 is formed into a belt-like shape to extend along the first direction X. The potential of the third conductive layer is a reference potential (ground potential). In the illustrated example, the third conductive layer CS3 is closer to the end portion 13E than the terminal member 22a and does not overlap the lead lines LTx and LRx. But the third conductive layer CS3 may be closer to the terminal member 22a than the end portion 13E and may overlap the lead lines LTx and LRx. Moreover, in the illustrated example, one third conductive layer CS3 is located between the terminal member 22a and the end portion 13E, but a plurality of them may be provided. Further, the shape of the third conductive layer CS3 is not limited to a straight line along the first direction X, but may be some other shape such as wavy. The third conductive layer CS3 may be formed from the same material as that of the first conductive layer CS1, the second conductive layer CS2, and conductive layer CS discussed in the first to third embodiments, or may be formed from a different material.

Figure 8:
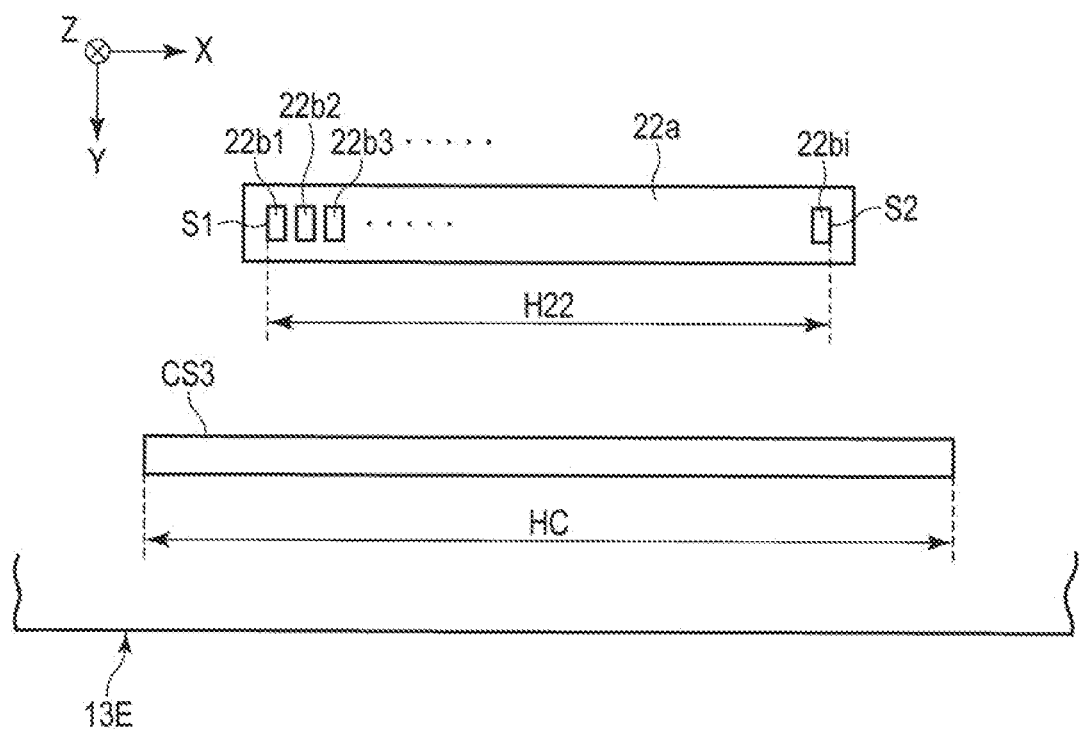
FIG. 8 is an enlarged plan view of a terminal member and a third conductive layer shown in FIG. 7.

As shown in FIG. 8, the terminal member 22a comprises a plurality of terminals 22b ( . . . 22b1, 22b2, 22bi) arranged along the first direction X. In this embodiment, a width H22 of the terminal member 22a along the first direction X is defined as the distance between terminals 22b located at both ends of the terminal member 22a along the first direction X. That is, a terminal 22b1 located at one end of the terminal member 22a comprises one end portion (side) S1, and a terminal 22bi located at the other end of the terminal member 22a comprises another end portion (side) S2. The width H22 is equivalent to the distance between the one end portion (side) S1 and the other end portion (side) S2 along the first direction X.

A width HC of the third conductive layer CS3 along the first direction X is greater than the width H22. Further, the third conductive layer CS3 is formed to be located between each of the terminals 22b and the end portion 13E. In the illustrated example, the terminals 22b are rectangular, but may be some other shape. In this case as well, the width H22 of the terminal member 22a along the first direction X is similarly defined. Further, the plurality of terminals 22b need not be arranged in line, but may be arranged in staggered fashion. Or the terminal member 22a may comprise a plurality of terminals 22b whose distances from the end portion 13E differ from one another.

Figure 9:
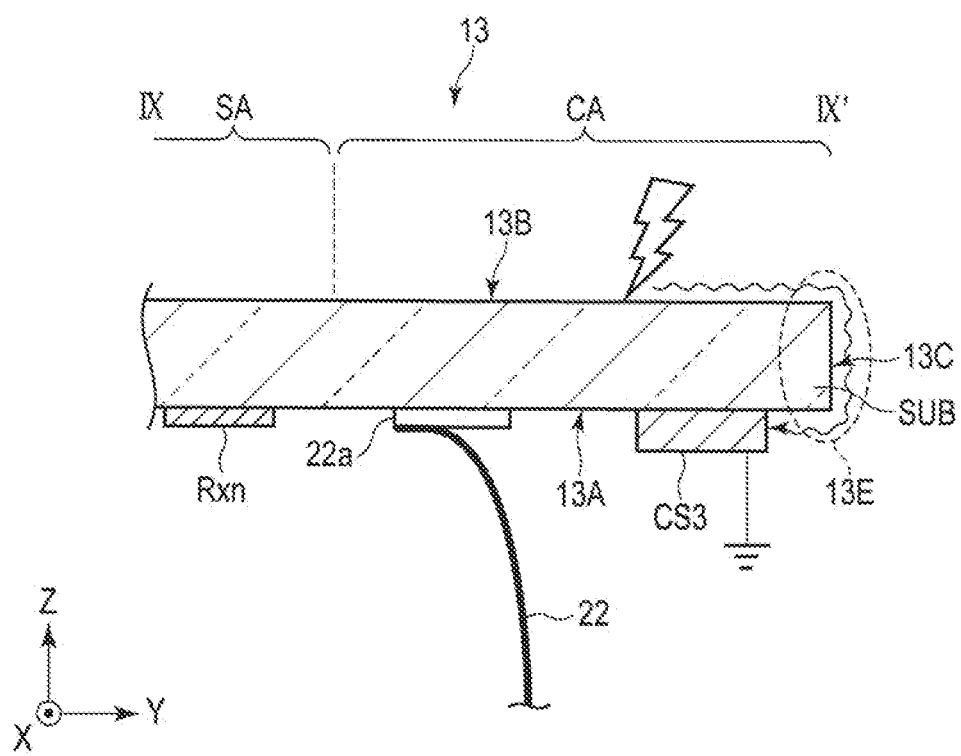
FIG. 9 is a cross section schematically showing the display device shown in FIG. 7.

FIG. 9 is a cross section of the touch panel 13 taken along line IX-IX' shown in FIG. 7.

The touch panel 13 is formed from a transparent substrate SUB of a resin or glass. The substrate SUB comprises a first main surface 13A on which a detection electrode Rxn, a drive electrode Tx (not shown) and a terminal member 22a are provided, a second main surface 13B as a touch operation surface on an opposite side to the first main surface 13A, and a side surface 13C which meets the first main surface 13A and the second main surface 13B.

In this embodiment, the end portion 13E of the touch panel 13 corresponds to the region surrounded with the dashed line in FIG. 9. More specifically, the end portion 13E is a region including the first main surface 13A, the second main surface 13B and the side surface 13C of the substrate SUB on the end on the second direction Y side. The third conductive layer CS3 is at the reference potential (ground potential) and is in contact with the main surface 13A between the end portion 13E and the terminal member 21a. The connection relationship between the third conductive layer CS3 and the reference potential member is the same as that of the example shown in FIGS. 4A and 4B. Further, the third conductive layer CS3 may extend to the end portion 13E, as will be described later.

In the illustrated example, the side surface 13C is a plane parallel to a X-Z plane defined by the first direction X and the third direction Z, but is not limited to this. For example, the side surface 13C may be a plane inclined with respect to the third direction Z, or a curved surface, or it may include a planar section and a curved section. Further, the touch panel 13 may include a protection film and the like, provided on, for example, a main surface 13A side in addition to the substrate SUB, the detection electrode Rx, the drive electrode Tx and the like.

According to the fourth embodiment, the third conductive layer CS3 is provided between the terminal member 22a and the end portion 13E on the terminal member 22a side. With this structure, it is possible to suppress the noise from propagating the creepage surface of the touch panel 13 and entering the terminal member 22a.

For example, as shown in FIG. 9, when static discharge occurs on the second main surface 13B, which is a touch operation surface, the noise current caused by the static discharge may sneak into the first main surface 13A through the end portion 13E of the touch panel 13. In other words, the noise current created in the second main surface 13B may propagate through the second main surface 13B, the side surface 13C and the first main surface 13A, to reach the terminal member 22a. According to this embodiment, the third conductive layer CS3 at the ground potential is in contact with the first main surface 13A between the terminal member 22a and the end portion 13E, and therefore the noise current propagating from the second main surface 13B through the end portion 13E and sneaking into the first main surface 13A is absorbed by the third conductive layer CS3 before entering the terminal member 22a.

Meanwhile, the size of the noise current propagating through the creepage surface of the touch panel 13 becomes smaller as the distance to propagate becomes larger. According to this embodiment, as shown in FIG. 8, the width HC of the third conductive layer CS3 is greater than the width H22 of the terminal member 22a. With this structure, for example, when the noise current propagating from the second main surface 13B through the end portion 13E and having reached the first main surface 13A detours both ends of the third conductive layer CS3 along the first direction X, the distance for the noise current to propagate through to the terminal member 22a is sufficiently large. In other words, the size of the noise current propagating from the second main surface 13B is sufficiently reduced by the time it reaches the terminal member 22a. Thus, according to this embodiment, it is possible to suppress noise current from entering the terminal member 22a.

Fifth Embodiment

Figure 10A:
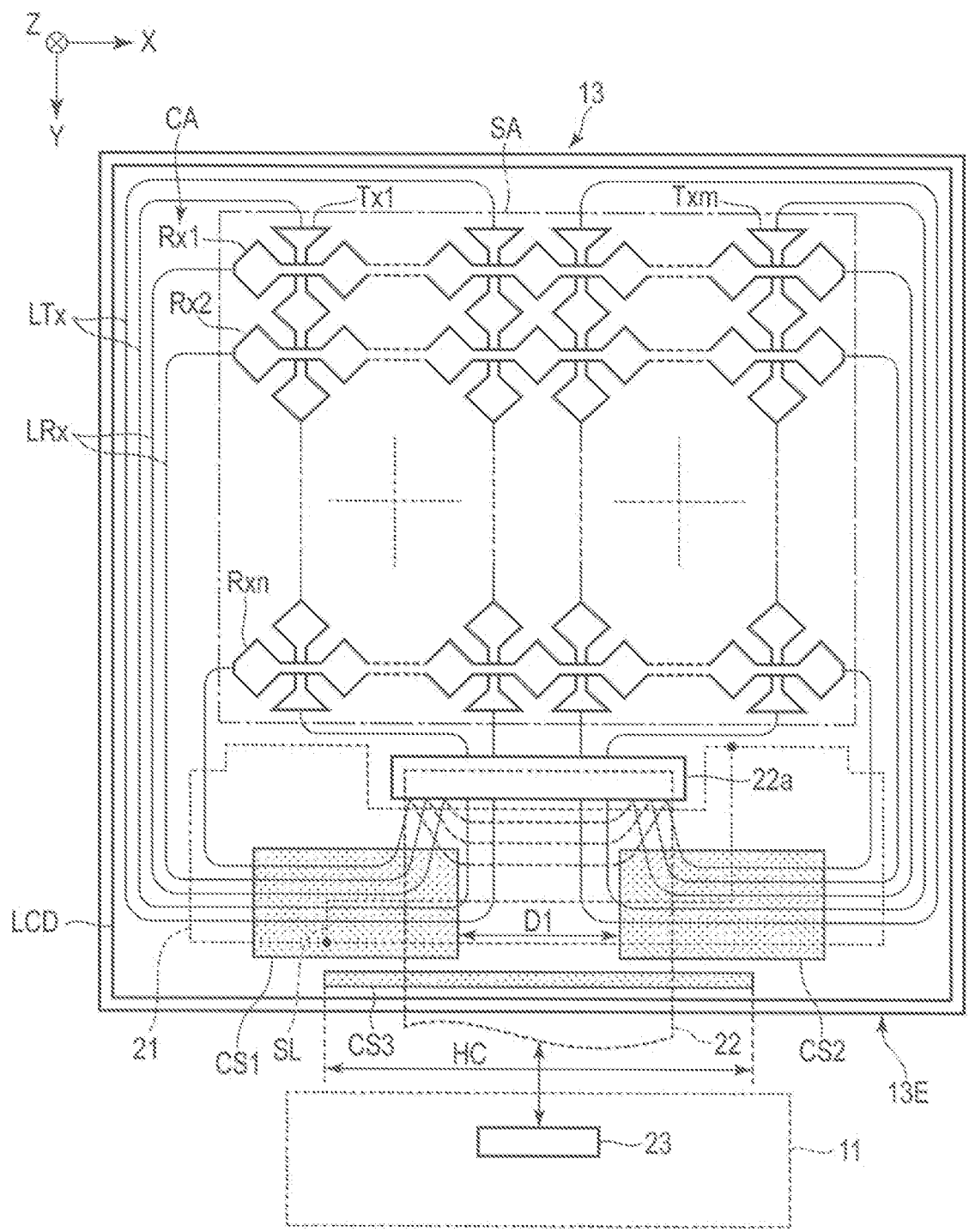
FIG. 10A is a plan view schematically showing a display device according to the fifth embodiment.
Figure 10B:
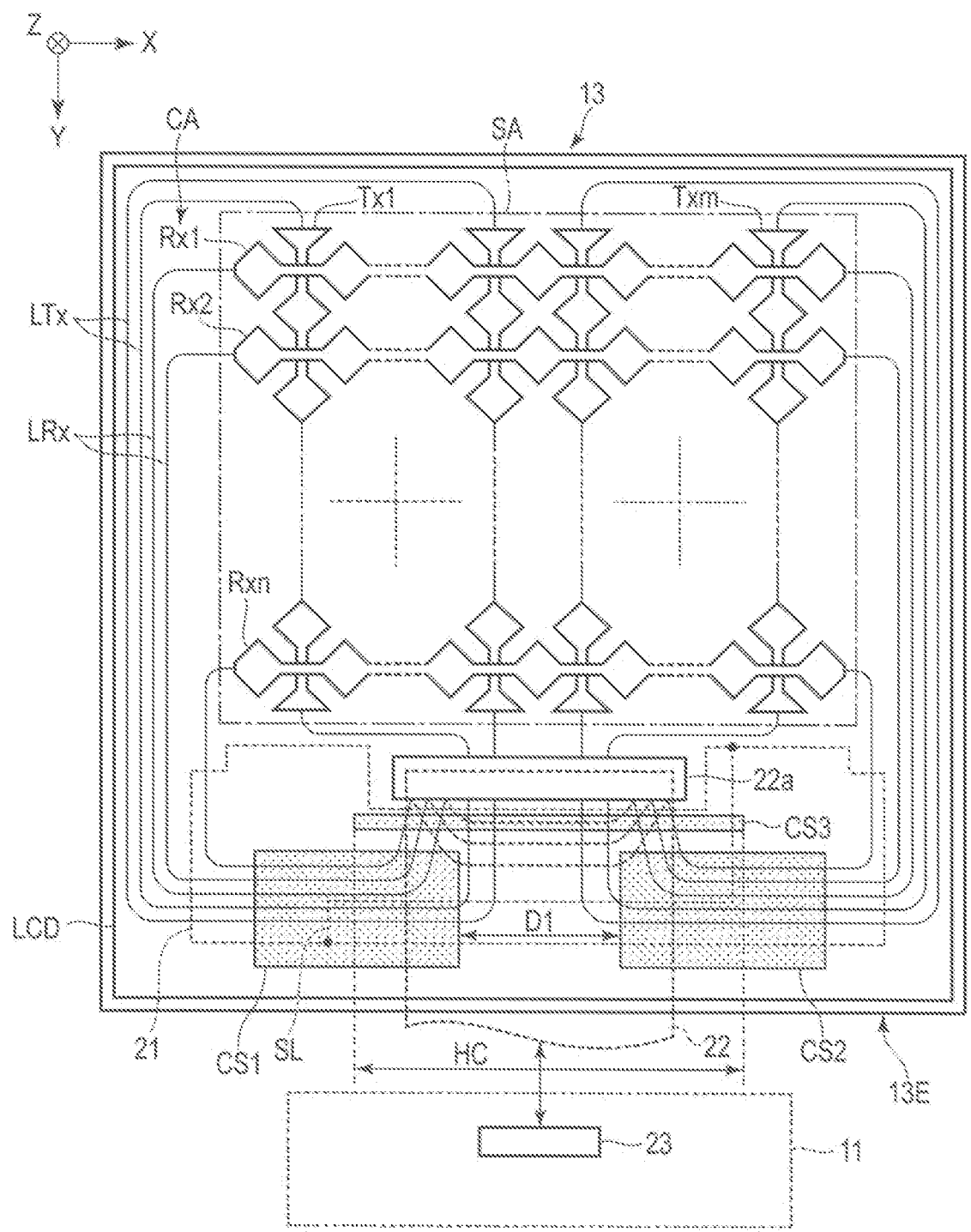
FIG. 10B is a plan view showing another example of the display device according to the fifth embodiment.

FIGS. 10A and 10B are plan views each schematically showing a touch panel 13 used in a display device according to the fifth embodiment. The fifth embodiment is different from the fourth embodiment in that the touch panel 13 further comprises a first conductive layer CS1 and a second conductive layer CS2 described in the first embodiment in addition to the third conductive layer CS3.

In the example shown in FIG. 10A, the third conductive layer CS3 is located closer to the end portion 13E than the first conductive layer CS1 and the second conductive layer CS2, and in the example shown in FIG. 10B, the third conductive layer CS3 is closer to the terminal member 22a than the first conductive layer CS1 and the second conductive layer CS2.

In this embodiment, the first conductive layer CS1, the second conductive layer CS2 and the third conductive layer CS3 are separated from each other, but are set to the same potential, for example, a reference potential (ground potential). A width HC of the third conductive layer CS3 along the first direction X is greater than a distance D1 between the first conductive layer CS1 and the second conductive layer CS2 along the first direction X. In the example shown in FIG. 10A, the third conductive layer CS3 is located between the first conductive layer CS1 and the end portion 13E and also between the second conductive layer CS2 and the end portion 13E. In the example shown in FIG. 10B, the first conductive layer CS1 and the second conductive layer CS2 are located between the third conductive layer CS3 and the end portion 13E.

According to this embodiment, it is possible to reduce the adverse effect of the noise current created in the lead lines LTx and LRx while suppressing the entering of the noise current to the terminal member 22a.

Sixth Embodiment

Figure 11B:
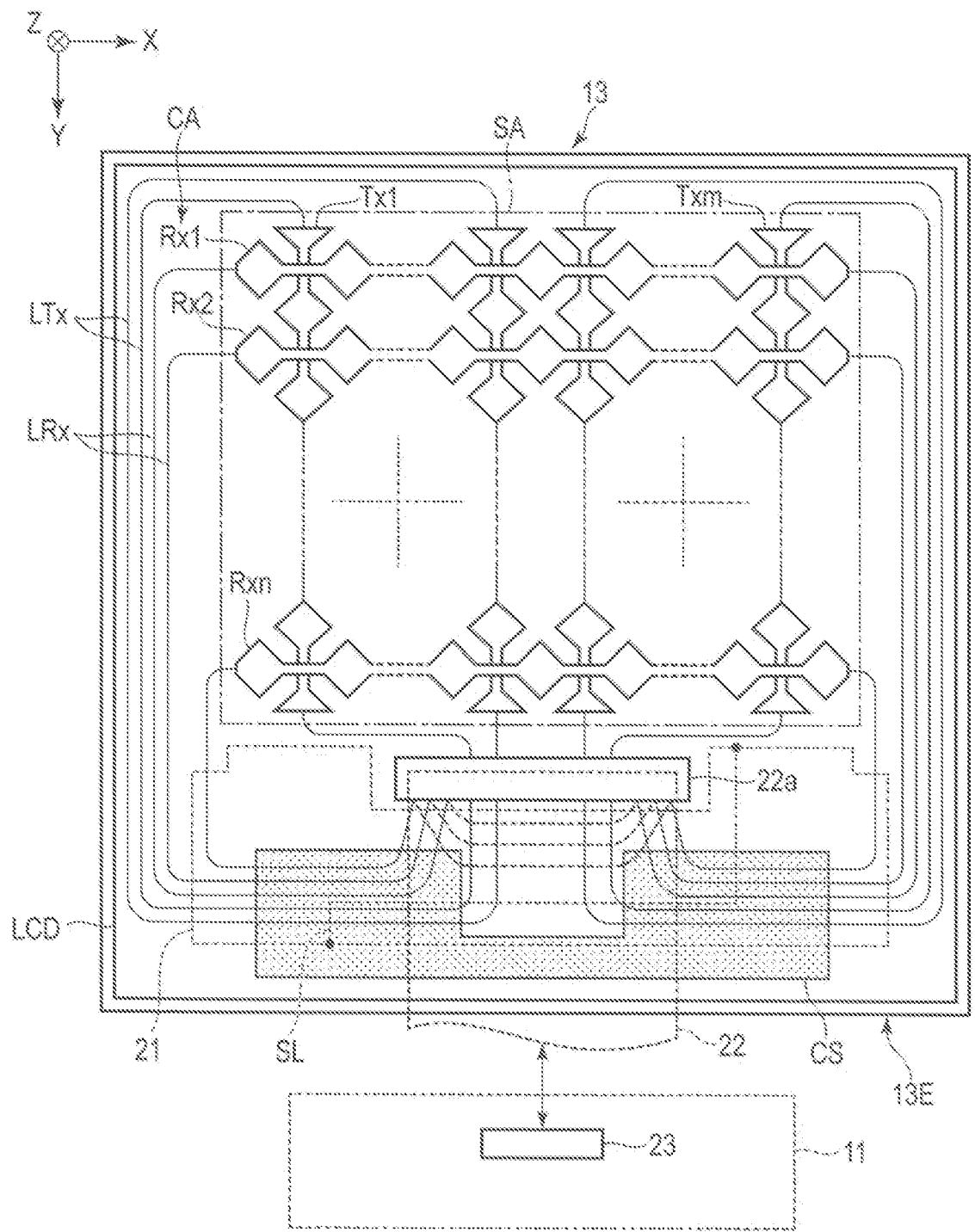
FIG. 11B is a plan view showing another example of the display device according to the sixth embodiment.

FIGS. 11A and 11B are plan views each schematically showing a touch panel 13 used in a display device according to the sixth embodiment. The sixth embodiment is different from the fifth embodiment in that the third conductive layer CS3 is connected to the first conductive layer CS1 and the second conductive layer CS2.

The third conductive layer CS3 is connected to the first conductive layer CS1 and the second conductive layer CS2 with an adhesive having conductivity as shown in FIG. 11A. Or, as shown in FIG. 11B, the first conductive layer CS1, the second conductive layer CS2 and the third conductive layer CS3 may be formed to be integrated as one. In other words, a conductive layer CS of a single member which overlaps the lead lines LTx and LRx and is in contact with the touch panel 13 may be provided between the terminal member 22a and the end portion 13E. In addition, the third conductive layer CS3 may be connected to the first conductive layer CS1 and the second conductive layer CS2 on a side of the terminal member 22a.

In this embodiment also, an advantageous effect similar to that of the fifth embodiment can be obtained. Further, when the first conductive layer CS1 and the second conductive layer CS2 are in contact with the touch panel 13, there is no transmitting path for noise current between the first conductive layer CS1, the second conductive layer CS2 and the third conductive layer CS3; therefore it becomes possible to further suppress the entering of the noise current to the terminal member 22a.

Seventh Embodiment

Figure 12:
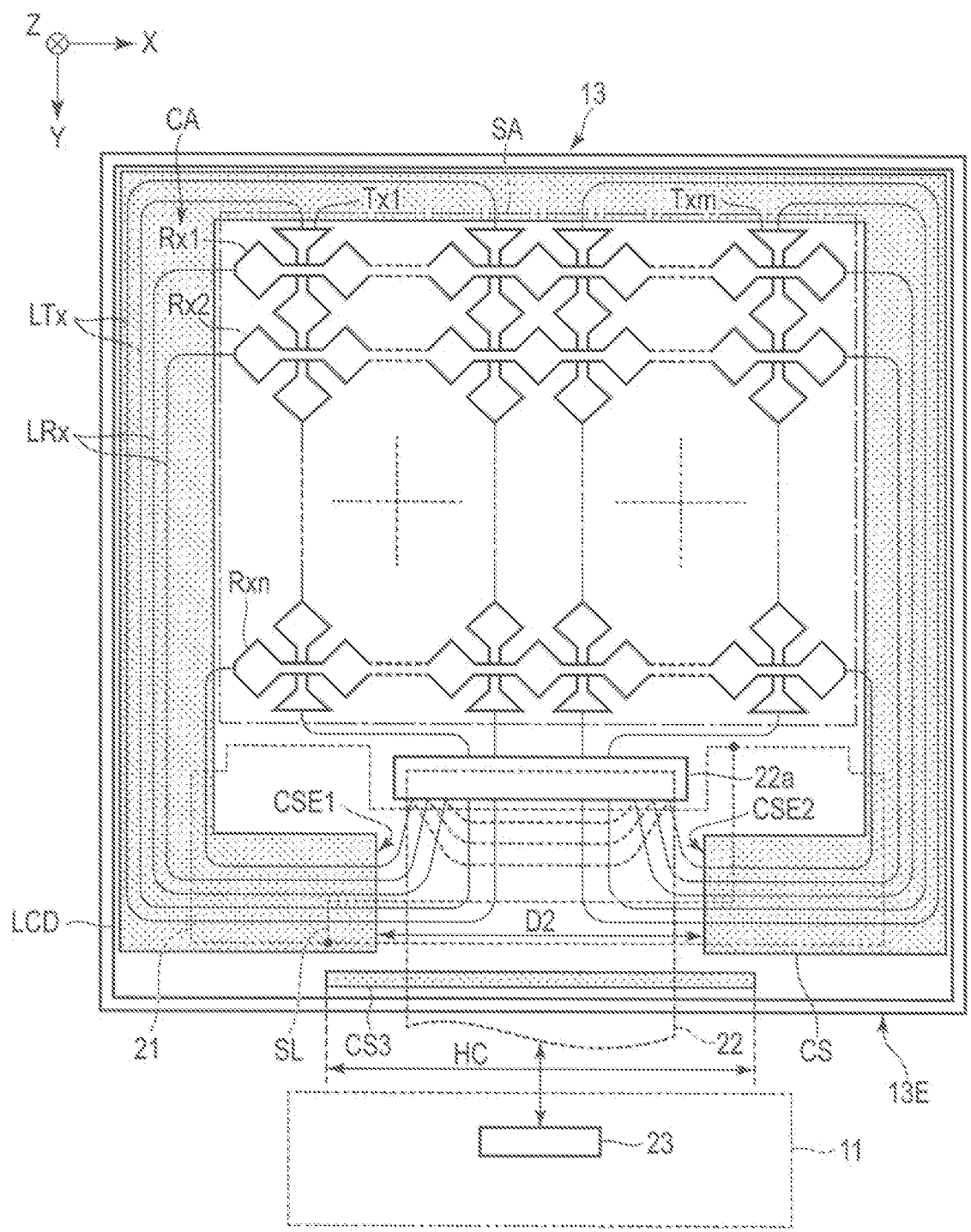
FIG. 12 is a plan view schematically showing a display device according to the seventh embodiment.

FIG. 12 is a plan view schematically showing a touch panel 13 used in a display device according to the seventh embodiment. The seventh embodiment comprises a conductive layer CS described in the third embodiment and a third conductive layer CS3 described in the fourth embodiment.

In the illustrated example, the third conductive layer CS3 is located closer to the end portion 13E than the conductive layer CS along the second direction Y, but it may be located between a first end portion CSE1 and a second end portion CSE2 of the conductive layer CS and the terminal member 22a. A width HC of the third conductive layer CS3 along the first direction X is greater than a distance D2 between the first end portion CSE1 and the second end portion CSE2 of the conductive layer CS along the first direction X.

In this embodiment also, an advantageous effect similar to that of the fifth embodiment can be obtained. Note that FIG. 5 illustrated for the second embodiment is equivalent to the state where the third conductive layer CS3 and the conductive layer CS of this embodiment are connected to each other. Therefore, with the conductive layer CS shown in FIG. 5 as well, it is possible to reduce the adverse effect of the noise current created in the lead lines LTx and LRx and suppress the noise current propagating the creepage surface of the touch panel 13 and entering the terminal member 22a.

Eighth Embodiment

Figure 13A:
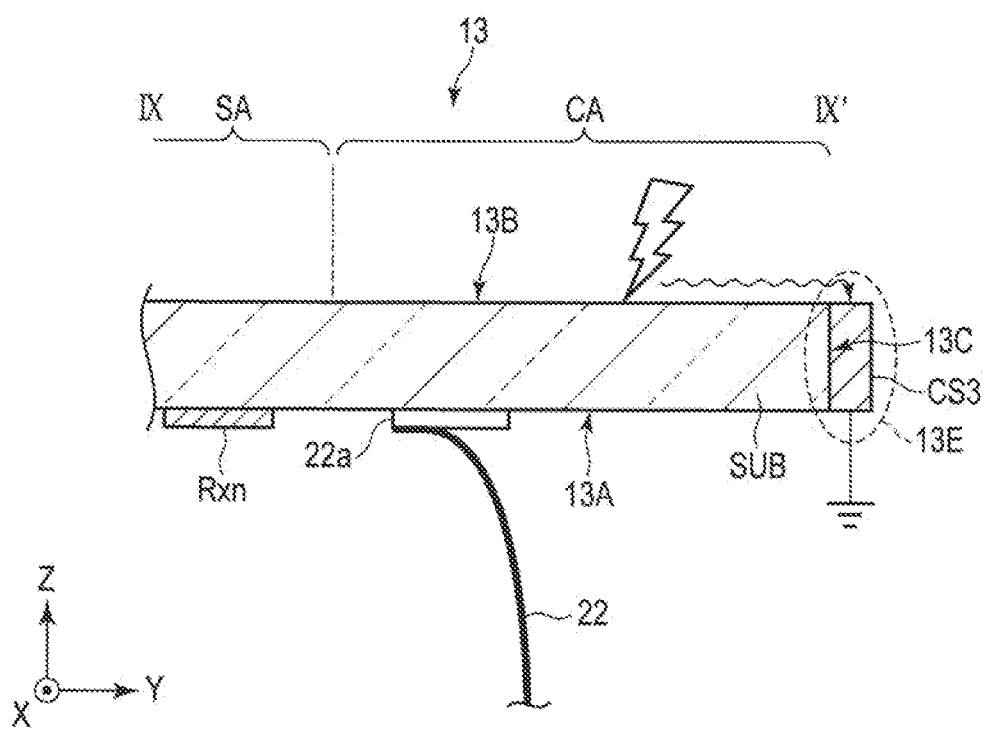
FIG. 13A is a cross section schematically showing a display device according to the eighth embodiment.
Figure 13B:
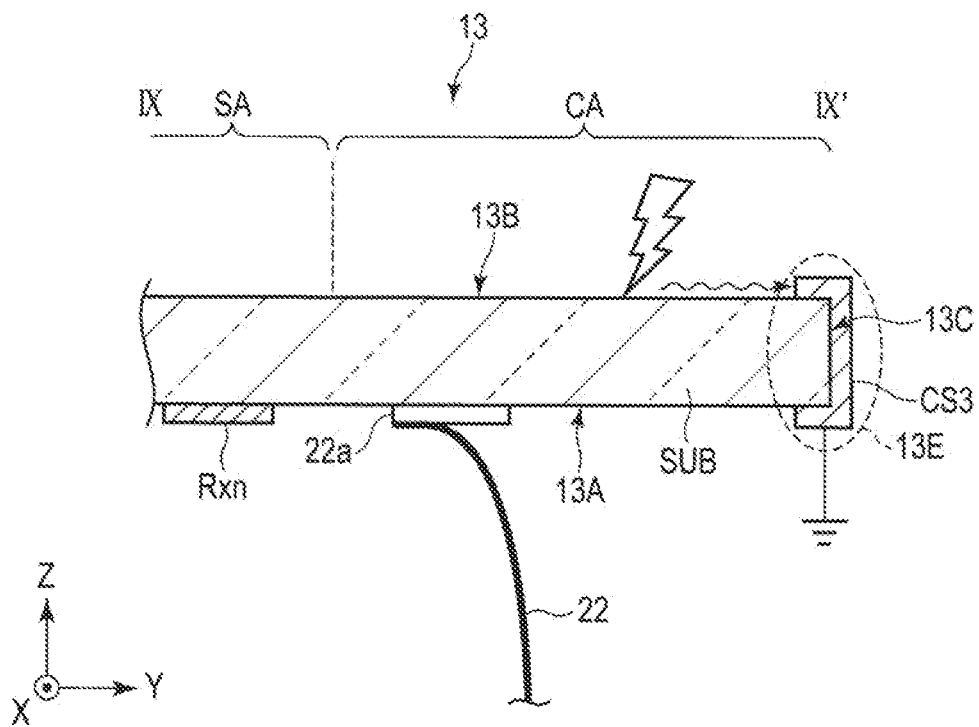
FIG. 13B is a cross section showing another example of the display device according to the eighth embodiment.

FIGS. 13A and 13B are cross sections of a touch panel 13 used in a display device according to the eighth embodiment. The eighth embodiment is different from the fourth to seventh embodiments in that a third conductive layer CS3 is in contact with a side surface 13C of a substrate SUB. In the example shown in FIG. 13A, the third conductive layer CS3 is in contact with the side surface 13C only. In the example shown in FIG. 13B, the third conductive layer CS3 has covers the end portion 13E. In other words, the third conductive layer CS3 is in contact with the second main surface 13B, the side surface 13C and the first main surface 13A. Note that it suffices if the third conductive layer CS3 is in contact with at least one of the first main surface 13A and the side surface 13C.

In this embodiment also, an advantageous effect similar to that of the fourth embodiment can be obtained.

Example of Application

The detection mode of the touch detection device (sensor) adopted by any of the embodiments described above may be any of the mutual capacitance mode (mutual mode) and the self-capacitance mode (self mode).

FIG. 14 shows a basic structure of a touch detection device 200 of the mutual capacitance mode. The touch detection device 200 comprises a touch panel 13 and a touch-panel driving IC chip 23 for controlling the touch panel 13. In the mutual capacitance mode, the substrate SUB of the touch panel 13 comprises a plurality of drive electrodes Tx (Tx1, Tx2, Tx3, . . . ) and a plurality of detection electrodes Rx (Rx1, Rx2, Rx3, . . . ) arranged to be insulated from and cross these drive electrodes Tx, to detect touch operation. The drive electrodes Tx (Tx1, Tx2, Tx3, . . . ), each being elongated along the second direction Y (or a lateral direction), are arranged in parallel to each other with gaps therebetween along in the first direction X (or a longitudinal direction). The detection electrodes Rx (Rx1, Rx2, Rx3, . . . ), each being elongated in the first direction X, are arranged in parallel with each other with gaps therebetween along the second direction Y. In each of the crossing portions between the drive electrodes Tx and the respective detection electrodes Rx, a capacitance is formed between each opposing pair of the electrodes.

Note that a common electrode to which a fixed potential is given in the display panel during a displaying period may be used as the drive electrodes Tx. In other words, in a display device called an incell type, the drive electrodes Tx (Tx1, Tx2, Tx3, . . . ) are used also as a common electrode for pixel circuits. In a display device called an on-cell type, the drive electrodes Tx and the detection electrodes Rx are provided as electrodes exclusively used for touch detection for the touch panel for touch detection (the substrate for touch detection). The touch detection device 200 is controlled by the touch-panel driving IC chip 23.

The touch detection period is dispersedly set, for example, in one frame. Therefore, in the display device, the display period and the touch detection period are time-divided. A selector SELA supplies pulse-form driving signals Txs to the drive electrodes Tx1, Tx2, Tx3, . . . , sequentially during the touch detection period. If the user's finger is contact with (touching) somewhere, the detection signal Rxs output from the detection electrode of the touched position is at a level lower than that of the detection signal Rxs output from the other detection electrodes. The example shown in the figure illustrates the case where the detection signal level when a touch is not detected is AP1, and the case where the detection signal level of the electrode which detects a touch is AP2<AP1.

The mutual capacitance mode which utilizes the drive electrodes Tx and the detection electrodes Rx is described above, but the drive electrodes Tx and the detection electrodes Rx may be used as electrodes of the self-capacitance mode. For example, the touch detection device 200 may be operated as a self-capacitance mode by using the drive electrodes Tx only, or by using the detection electrodes Rx only. Such operation is executed, for example, in a power saving state.

Figure 15:
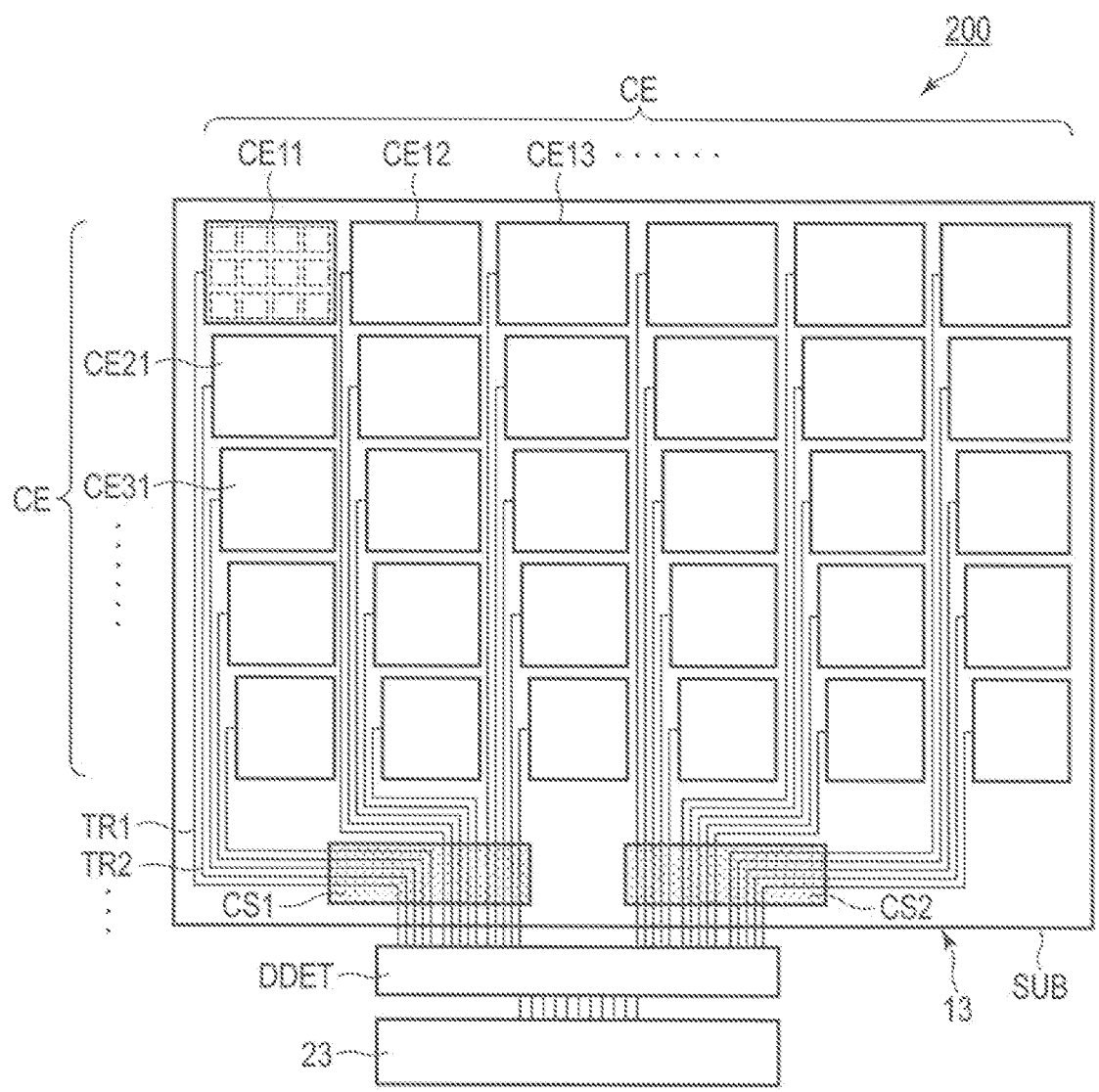
FIG. 15 is a plan view schematically showing a self-capacitive touch detection device applied to the display devices according to the first to eighth embodiments.

FIG. 15 shows a structural example of the touch detection device 200 of the self-capacitance mode. The touch detection device 200 comprises a touch panel 13, a touch-panel driving IC chip 23 and a drive-detect circuit DDET. In the self-capacitance mode, the substrate SUB of the touch panel 13 comprises a plurality of common electrodes CE (CE11, CE12, CE13, . . . , CE21, CE22, CE23, . . . , CE31, CE32, CE33, . . . ) arranged in a matrix to detect touch operation. Lead lines TR (TR1, TR2, . . . ) are connected to the common electrodes CE, respectively. The lead lines TR are connected to the drive-detect circuit DDET. The drive-detect circuit DDET is provided in the non-display area of the first substrate (array substrate) SUB1 of the liquid crystal display panel LCD, for example. The drive-detect circuit DDET is controlled by the touch-panel driving IC chip 23 (controller), to control the touch detection function. Note that the area of one common electrode CE is, for example, about 24 times that of one pixel region.

Figure 16A:
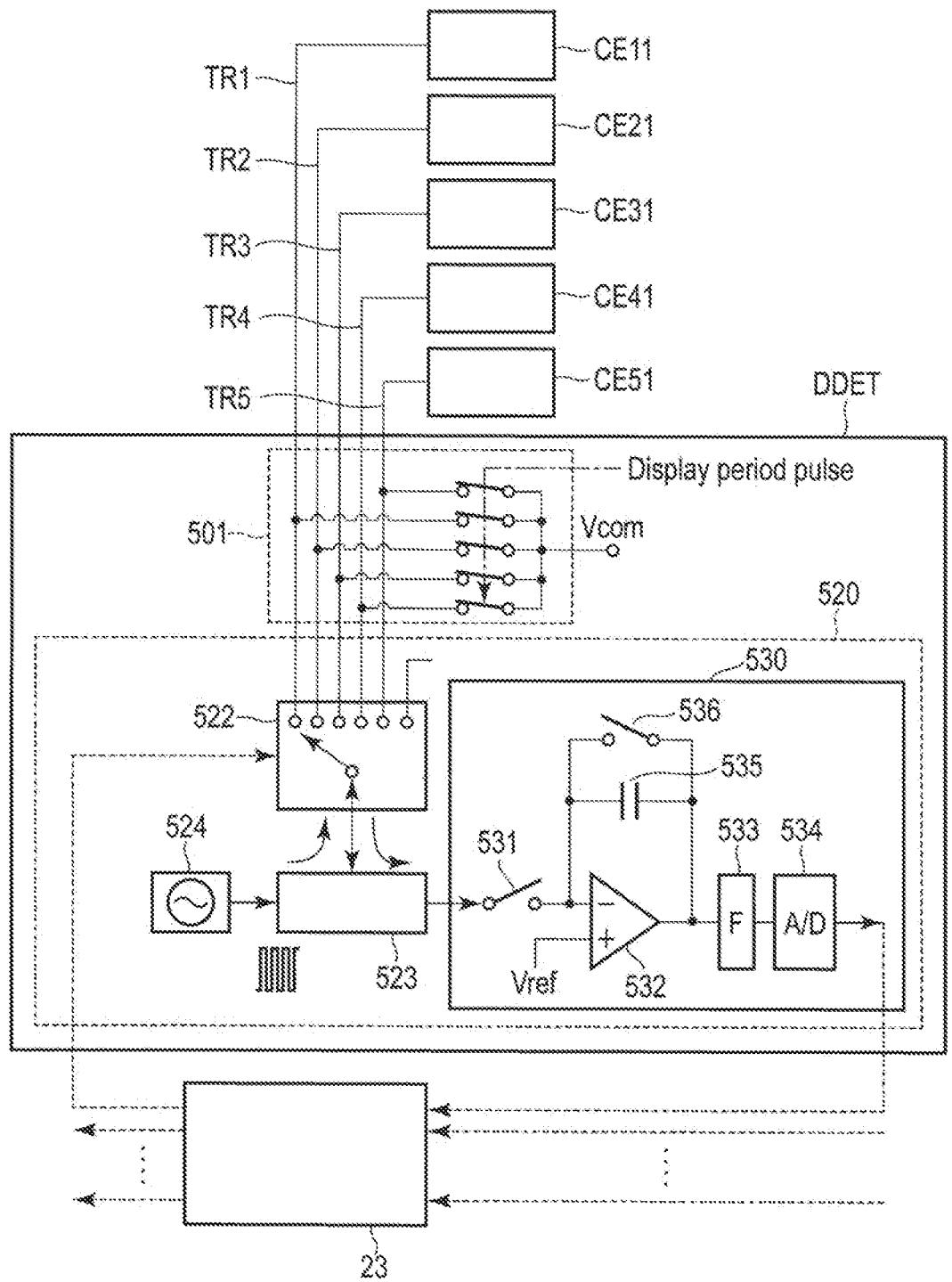
FIG. 16A is a diagram showing the details of the touch detection device shown in FIG. 15.

FIG. 16A shows a plurality of common electrodes CE (CE11, CE21, CE31, . . . ) constituting one column along the second direction Y of the the self-capacitance touch detection device 200 shown in FIG. 15. The common electrodes CE are connected to the touch-panel driving IC chip 23 through the drive-detect circuit DDET. The drive-detect circuit DDET comprises a first selector 501 which can select the common voltage Vcom, and a sensing circuit 520. The following description is based on an assumption case where these common electrodes CE include five common electrodes CE11, CE21, CE31, CE41 and CE51.

The lead lines TR1 to TR5 are drawn from the common electrodes CE11 to CE51, respectively, to the drive-detect circuit DDET. The drive-detect circuit DDET comprises the first selector 501 for applying the common voltage Vcom to all of the common electrodes CE11 to CE51 during the display period. Further, the lead lines TR1 to TR5 are connected to a second selector 522 in the sensing circuit 520 through the first selector 501.

Figure 16B:
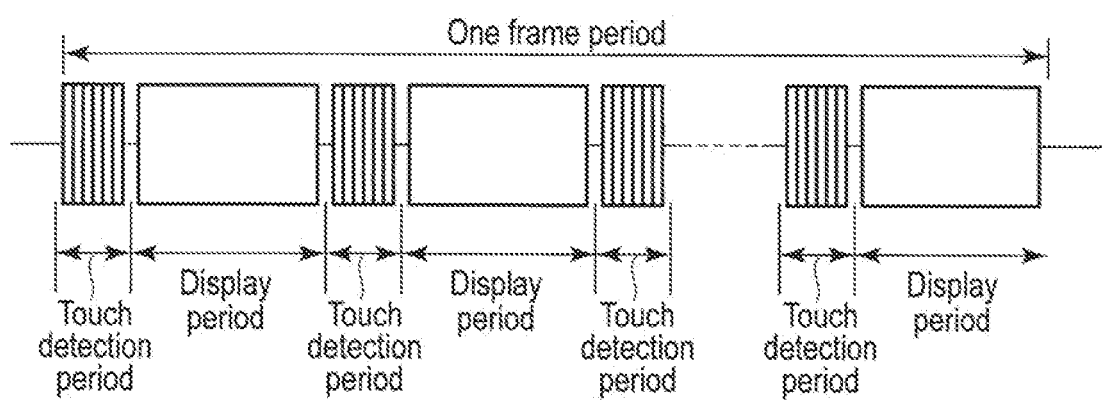
FIG. 16B is a timing chart of the touch detection device shown in FIG. 16A.

The second selector 522 selects each of the lead lines TR1 to TR5 one by one to supply a sensor signal to each of the lead lines TR1 to TR5. The sensor signal supply period is the touch detection period shown in FIG. 16B. Within one frame, the display period is time-divided and the touch detection period is set between a display period and another display period.

The sensor signal is generated by a sensor signal generator 524 and is input to the second selector 522 through a conversion circuit 523. Further, the sensor signal is output as a detection signal also to an output side of the conversion circuit 523, that is, a detection circuit 530 side. Let us suppose now that the user is touching with a finger one of the common electrodes CE11 to CE51. Then, when the sensor signal is supplied to the common electrode, the sensor signal output from the conversion circuit 523 is at a level (touch detection level) different from a level (non-detection level) of the case where not touching.

The configuration of the conversion circuit 523 is not particularly limited, but may be configured, for example, to be connected to a plurality of common electrodes CE for detecting touch operation by capacitance coupling. In this case, a common electrode CE is driven by a signal of the sensor signal generator 524 through capacitance coupling. Whether there is a touch or not can be detected with the detection circuit by measuring the fluctuation voltage level of the common electrode CE. When a finger is touching a common electrode CE, the capacitance component of the common electrode CE is greater as compared to that when a finger is not touching. Therefore, when a finger is touching, the voltage fluctuation of the common electrode CE becomes less as compared to that when a finger is not touching.

The detection circuit 530 comprises a switch 531, an operational amplifier 532, a filter 533 and an A/D converter 534. The operational amplifier 532 may be configured to be able to connect to (during the touch detection period) and disconnect from (during the display period) the conversion circuit 523 by the switch 531 provided in its pervious stage.

The operational amplifier 532 receives the sensor signal from the conversion circuit 523 and outputs a difference between this signal and a threshold Vref. Further, a capacitor 535 and the switch 536 are connected in parallel to the operational amplifier 532. The output of the operational amplifier 532 is reset by, for example, turning on the switch 536 during the display period. The switch 531 and the switch 536 are switched based on, for example, the control data from the touch-panel driving IC chip 23.

The value output from the operational amplifier 532 is subjected to the filter 533 to remove noise therein and then converted to a digital signal by the A/D converter 534. This digital value is input to the touch-panel driving IC chip 23 as touch detection data. The touch-panel driving IC chip 23 executes arithmetic operation based on the data from the sensing circuit 520, and pinpoints the touch position. The touch-panel driving IC chip 23 stores sequence control data for controlling the first selector 501, the second selector 522, the switch 531, etc. Therefore, the touch-panel driving IC chip 23 is able to detect, when touch detection data is input from the detection circuit 530, from which common electrode the detection data is output.

In the description provided above, the touch detection operation using the common electrodes CE11 to CE51 of the first column is illustrated, but the touch detection operation is executed in a similar method sequentially onto the common electrodes of the second column, the third column and so on as well. In this case, the sensing circuit 520 may be used as a sensing circuit for each column sequentially. Or an exclusive sensing circuit may be provided for each column.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
  a display area;
  a peripheral area surrounding the display area;
  a plurality of detection electrodes corresponding to the display area;
  a plurality of terminals provided in the peripheral area;
  a plurality of lead lines connecting between the plurality of terminals and the plurality of detection electrodes;
  a first conductive layer overlapping a first part of the lead lines in planar view; and
  a second conductive layer overlapping a second part of the lead lines in planar view,
  wherein the first conductive layer and the second conductive layer are arranged side by side in a direction along an outermost edge of the peripheral area.

2. The display device according to claim 1, wherein the plurality of terminals are connected to a first wiring board, and the first conductive layer, the second conductive layer and the plurality of lead lines overlap the first wiring board in planar view.

3. The display device according to claim 1, wherein the first conductive layer and the second conductive layer are connected to a reference potential member.

4. The display device according to claim 3, wherein the reference potential member is a housing provided to oppose the display panel.

5. The display device according to claim 4, wherein the housing is connected to a reference potential by a fixing member.

6. The display device according to claim 4, wherein the housing is connected to a reference potential by capacitance coupling.

7. The display device according to claim 1, wherein the first conductive layer and the second conductive layer further overlap a video signal line connected to the display device.

8. The display device according to claim 1, wherein each of the first conductive layer and the second conductive layer has an end connected to a back side of the display panel to provide a reference potential.

9. The display device according to claim 1, wherein the plurality of detection electrodes are arranged in a matrix.

10. The display device according to claim 1, further comprising:
a third conductive layer between the first conductive layer and the outermost edge, and between the second conductive layer and the outermost edge.

11. A touch panel comprising:
a detection area;
a peripheral area surrounding the detection area;
a plurality of detection electrodes arranged in the detection area;
a plurality of terminals provided in the peripheral area;
a plurality of lead lines connecting between the plurality of terminals and the plurality of detection electrodes;
a first conductive layer overlapping a first part of the lead lines in planar view; and
a second conductive layer overlapping a second part of the lead lines in planar view,
wherein the first conductive layer and the second conductive layer are arranged side by side in a direction along an outermost edge of the peripheral area.

12. The touch panel according to claim 11, wherein the plurality of terminals are connected to a first wiring board, and
the first conductive layer, the second conductive layer and the plurality of lead lines overlap the first wiring board in planar view.

13. The touch panel according to claim 11, wherein the first conductive layer and the second conductive layer are connected to a reference potential member.

14. The touch panel according to claim 13, wherein the reference potential member is a housing provided to oppose the touch panel.

15. The touch panel according to claim 14, wherein the housing is connected to a reference potential by a fixing member.

16. The touch panel according to claim 14, wherein the housing is connected to a reference potential by capacitance coupling.

17. The touch panel according to claim 11, wherein the first conductive layer and the second conductive layer further overlap a video signal line connected to the display device.

18. The touch panel according to claim 11, wherein each of the first conductive layer and the second conductive layer has an end connected to a back side of the touch panel to provide a reference potential.

19. The touch panel according to claim 11, wherein the plurality of detection electrodes are arranged in a matrix.

20. The touch panel according to claim 11, further comprising:
a third conductive layer between the first conductive layer and the outermost edge, and between the second conductive layer and the outermost edge.

* * * * *